(12) United States Patent
Kim et al.

(10) Patent No.: US 11,706,536 B2
(45) Date of Patent: Jul. 18, 2023

(54) IMAGE SENSOR INCLUDING NOISE COMPENSATOR AND IMAGE SENSING SYSTEM INCLUDING THE SAME

(71) Applicant: SAMSUNG ELECTRONICS CO., LTD., Suwon-si (KR)

(72) Inventors: Yun Hong Kim, Seoul (KR);
Kyung-Min Kim, Yeongcheon-si (KR);
Hee Sung Chae, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 3 days.

(21) Appl. No.: 17/393,803

(22) Filed: Aug. 4, 2021

(65) Prior Publication Data
US 2022/0174230 A1 Jun. 2, 2022

(30) Foreign Application Priority Data
Nov. 27, 2020 (KR) .................. 10-2020-0161970

(51) Int. Cl.
*H04N 25/60* (2023.01)
(52) U.S. Cl.
CPC ................... *H04N 25/60* (2023.01)
(58) Field of Classification Search
CPC ........ H04N 5/357; H04N 5/361; H04N 5/363; H04N 25/60; H04N 25/709; H04N 25/75; H04N 25/77; H04N 25/76; H04N 25/772
See application file for complete search history.

(56) References Cited

U.S. PATENT DOCUMENTS

| | | | |
|---|---|---|---|
| 9,264,639 B2 | 2/2016 | Guidash et al. | |
| 9,537,501 B2 | 1/2017 | Lee et al. | |
| 9,723,241 B2 | 8/2017 | Yeh et al. | |
| 10,334,193 B2 | 6/2019 | Cho et al. | |
| 10,531,028 B2 | 1/2020 | Matsuura et al. | |
| 2005/0088549 A1* | 4/2005 | Hatano | H04N 5/217 348/241 |
| 2010/0259430 A1* | 10/2010 | Okamoto | H04N 5/3575 341/122 |
| 2015/0263714 A1* | 9/2015 | Yoo | H03K 4/08 327/133 |
| 2017/0237914 A1* | 8/2017 | Cho | H04N 5/3698 348/241 |
| 2018/0124337 A1* | 5/2018 | Kim | H04N 5/378 |
| 2018/0234649 A1* | 8/2018 | Matsuura | H04N 5/357 |
| 2019/0068902 A1* | 2/2019 | Nishino | G05F 3/262 |
| 2019/0224314 A1 | 7/2019 | Cho | |

\* cited by examiner

*Primary Examiner* — Ahmed A Berhan
(74) *Attorney, Agent, or Firm* — Sughrue Mion, PLLC

(57) ABSTRACT

An image sensor includes a pixel configured to generate a pixel signal, using an analog signal processing voltage, a ramp signal generator configured to generate a ramp signal, using the analog signal processing voltage, a bias voltage generator configured to generate a bias voltage, using the analog signal processing voltage, and a noise compensator configured to generate a noise component, using a digital signal processing voltage and the analog signal processing voltage, and add the generated noise component to the generated bias voltage. The image sensor further includes a conversion circuit configured to generate a reference voltage, based on the generated ramp signal and the bias voltage to which the noise component is added, and generate an image signal by performing analog-to-digital conversion on the generated pixel signal, based on the generated reference voltage.

19 Claims, 24 Drawing Sheets

IMAGE SENSOR INCLUDING NOISE COMPENSATOR AND IMAGE SENSING SYSTEM INCLUDING THE SAME

CROSS-REFERENCE TO RELATED APPLICATION

This application is based on and claims priority under 35 U.S.C. § 119 to Korean Patent Application No. 10-2020-0161970, filed on Nov. 27, 2020, in the Korean Intellectual Property Office, the disclosure of which is incorporated by reference herein in its entirety.

BACKGROUND

1. Field

The disclosure relates to an image sensor and an image sensing system including the same.

2. Description of Related Art

An image sensing device is one of semiconductor elements that converts optical information into an electrical signal. Image sensing devices may include charge coupled device (CCD) image sensing devices and complementary metal oxide semiconductor (CMOS) image sensing devices.

A CMOS image sensor may be abbreviated as a CIS. A CIS may include a plurality of pixels arranged in two dimensions. Each of the pixels may include, for example, a photodiode. The photodiode may convert incident light into an electrical signal.

Recently, with the development of computer and communication industries, the demand for image sensors with enhanced performance has been increasing in various fields such as digital cameras, camcorders, smartphones, game devices, security cameras, micro-cameras for medical use, and robots.

SUMMARY

Provided is an image sensor with improved product reliability by compensating for voltage noise of an image signal.

Provided is also an image sensing system with improved product reliability by compensating for voltage noise of an image signal.

Additional aspects will be set forth in part in the description that follows and, in part, will be apparent from the description, or may be learned by practice of presented embodiments.

In accordance with an aspect of the disclosure, an image sensor includes a pixel configured to generate a pixel signal, using an analog signal processing voltage, a ramp signal generator configured to generate a ramp signal, using the analog signal processing voltage, a bias voltage generator configured to generate a bias voltage, using the analog signal processing voltage, and a noise compensator configured to generate a noise component, using a digital signal processing voltage and the analog signal processing voltage, and add the generated noise component to the generated bias voltage. The image sensor further includes a conversion circuit configured to generate a reference voltage, based on the generated ramp signal and the bias voltage to which the noise component is added, and generate an image signal by performing analog-to-digital conversion on the generated pixel signal, based on the generated reference voltage.

In accordance with an aspect of the disclosure, an image sensor includes a pixel configured to generate a pixel signal, using an analog signal processing voltage, a ramp signal generator configured to generate a ramp signal, using the analog signal processing voltage, a bias voltage generator configured to generate a bias voltage, using the analog signal processing voltage, a conversion circuit configured to generate a reference voltage, based on the generated bias voltage and the generated ramp signal, and generate a first digital signal by performing analog-to-digital conversion on the generated pixel signal, based on the generated reference voltage. The image sensor further includes a noise compensator configured to generate a noise signal, using a digital signal processing voltage and the analog signal processing voltage, and generate a second digital signal by performing analog-to-digital conversion on the generated noise signal, based on the generated ramp signal, and a subtracter configured to generate a third digital signal by subtracting the generated second digital signal from the generated first digital signal.

In accordance with an aspect of the disclosure, an image sensing system includes an image sensor configured to output an image signal by sensing light incident on a pixel, and an image signal processor configured to process the outputted image signal, using a first digital signal processing voltage. The image sensor includes the pixel configured to generate a pixel signal, using an analog signal processing voltage, a ramp signal generator configured to generate a ramp signal, using the analog signal processing voltage, a bias voltage generator configured to generate a bias voltage, using the analog signal processing voltage, and a noise compensator configured to generate a noise component, using the first digital signal processing voltage, a second digital signal processing voltage and the analog signal processing voltage, and add the generated noise component to the generated bias voltage. The image sensor further includes a conversion circuit configured to generate a reference voltage, based on the generated ramp signal and the bias voltage to which the noise component is added, and generate the image signal by performing analog-to-digital conversion on the generated pixel signal, based on the generated reference voltage.

BRIEF DESCRIPTION OF THE DRAWINGS

The above and other aspects, features, and advantages of embodiments of the disclosure will be more apparent from the following description taken in conjunction with the accompanying drawings.

DETAILED DESCRIPTION

Hereinafter, embodiments will be described in more detail with reference to the accompanying drawings.

Figure 1:
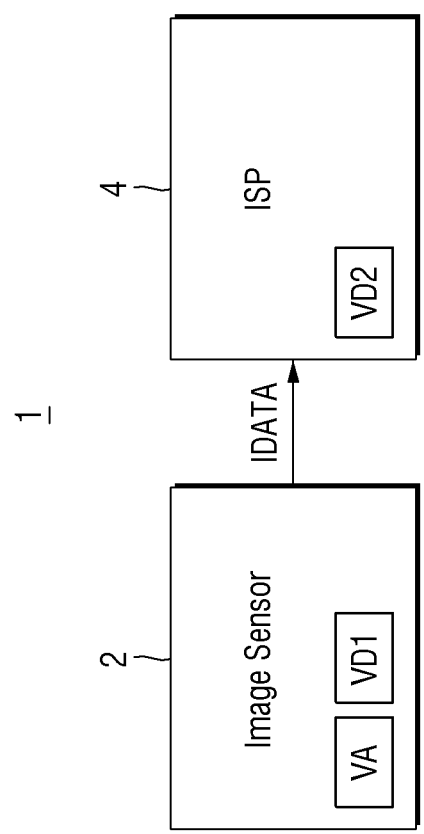
FIG. 1 is a block diagram of an image sensing system according to embodiments.

FIG. 1 is a block diagram of an image sensing system 1 according to embodiments.

Referring to FIG. 1, the image sensing system 1 may include an image sensor 2 and an image signal processor 4 (ISP).

The image sensor 2 may be connected to the image signal processor 4 to provide image data IDATA to the image signal processor 4. The image sensor 2 may generate the image data IDATA using an analog signal processing voltage VA and a first digital signal processing voltage VD1.

The image signal processor 4 may receive the image data IDATA from the image sensor 2 and perform image processing on the image data IDATA. The image signal processor 4 may perform image processing on the image data IDATA using a second digital signal processing voltage VD2. However, embodiments are not limited thereto, and the image sensor 2 and the image signal processor 4 may also use other types of voltages.

Figure 2:
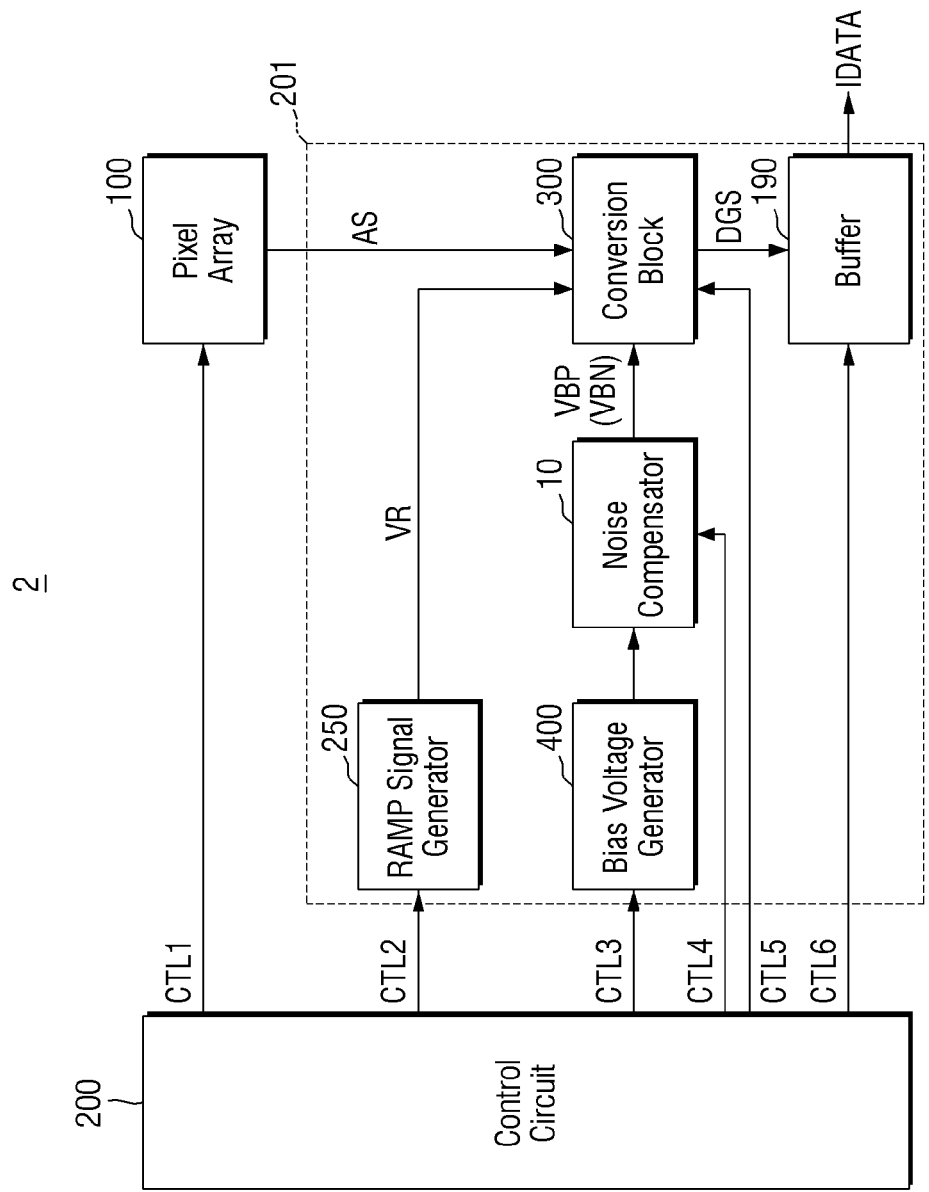
FIG. 2 is a block diagram of an image sensor according to embodiments.

FIG. 2 is a block diagram of the image sensor 2 according to embodiments.

Referring to FIG. 2, the image sensor 2 may include a pixel array 100, a control circuit 200, and a readout circuit 201. The readout circuit 201 may include a ramp signal generator 250, a bias voltage generator 400, a noise compensator 10, a conversion block 300, and a buffer 190.

The pixel array 100 may generate an analog signal AS by sensing incident light. The pixel array 100 may include a plurality of unit pixels composed of a plurality of rows and columns. Each of the unit pixels may generate the analog signal AS by sensing incident light.

The ramp signal generator 250 may generate a ramp signal VR that changes linearly with a slope of a magnitude.

The bias voltage generator 400 may generate a bias voltage VBP or VBN based on a power supply voltage. The bias voltage generator 400 may adjust the magnitude of an alternating current (AC) component of the bias voltage VBP or VBN and then provide the bias voltage VBP or VBN to the conversion block 300 through the noise compensator 10.

The noise compensator 10 may add a noise component to the bias voltage VBP. The noise compensator 10 may sample power supply voltages and add a noise component to the bias voltage VBP based on the power supply voltages.

The conversion block 300 may generate a reference voltage based on the bias voltage VBP and the ramp signal VR. The conversion block 300 may generate a digital signal DGS by performing single slope analog-to-digital conversion on the analog signal AS using the reference voltage. The conversion block 300 may provide the generated digital signal DGS to the buffer 190.

The control circuit 200 may generate first through sixth control signals CTL1 through CTL6. The control circuit 200 may control the operation of the pixel array 100 through the first control signal CTL1, control the operation of the ramp signal generator 250 through the second control signal CTL2, control the operation of the bias voltage generator 400 through the third control signal CTL3, control the operation of the noise compensator 10 through the fourth control signal CTL4, control the operation of the conversion block 300 through the fifth control signal CTL5, and control the operation of the buffer 190 through the sixth control signal CTL6.

The buffer 190 may temporarily store the digital signal DGS and then amplify the digital signal DGS and output the amplified digital signal DGS as image data IDATA.

Figure 3:
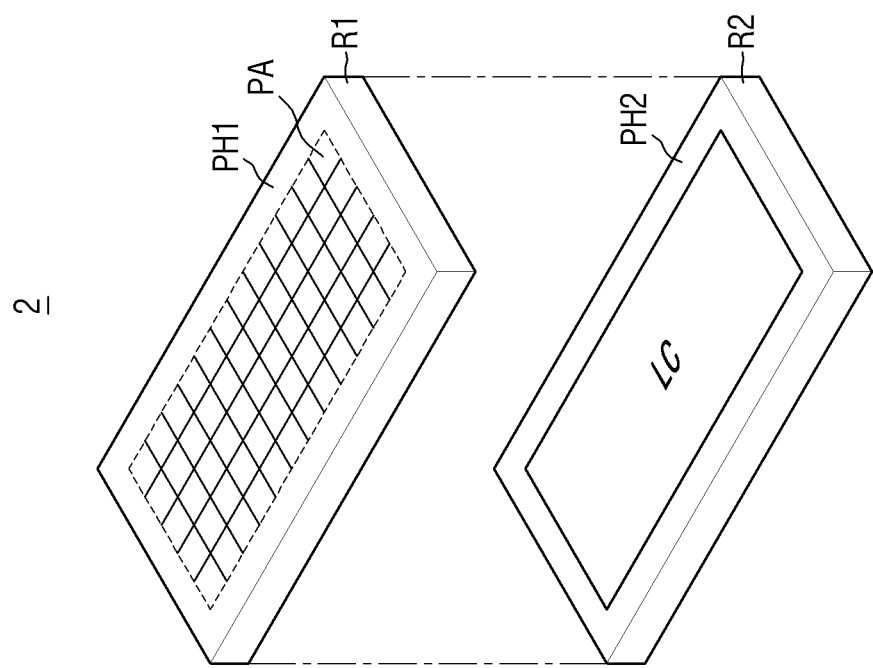
FIG. 3 is a diagram for explaining a conceptual layout of the image sensor according to the embodiments.

FIG. 3 is a diagram for explaining a conceptual layout of the image sensor 2 according to the embodiments.

Referring to FIG. 3, the image sensor 2 may include a first region R1 and a second region R2 stacked in a first direction (e.g., a vertical direction). The first region R1 and the second region R2 may extend in a second direction and a third direction intersecting the first direction as illustrated in the drawing, and the blocks illustrated in FIG. 2 may be disposed in the first region R1 and the second region R2.

A third region in which a memory is disposed may be disposed under the second region R2. Here, the memory disposed in the third region may receive image data from the first region R1 and the second region R2, store or process the image data, and transmit the image data back to the first region R1 and the second region R2. In this case, the memory may include a memory element such as a dynamic random access memory (DRAM) element, a static random access memory (SRAM) element, a spin transfer torque magnetic random access memory (STT-MRAM) element, or a flash memory element. When the memory includes, for example, a DRAM element, it may receive and process image data at a relatively high speed. In addition, in some embodiments, the memory may be disposed in the second region R2.

The first region R1 may include a pixel array PA and a first peripheral region PH1, and the second region R2 may include a logic circuit region LC and a second peripheral region PH2. The first region R1 and the second region R2 may be sequentially stacked in the vertical direction.

In the first region R1, the pixel array PA may be the same as the pixel array 100 described with reference to FIG. 2. The pixel array 100 may include a plurality of unit pixels arranged in a matrix. Each pixel may include a photodiode and transistors.

The first peripheral region PH1 may include a plurality of pads and may be disposed around the pixel array PA. The pads may transmit and receive electrical signals to and from an external device.

In the second region R2, the logic circuit region LC may include electronic elements including a plurality of transistors. The electronic elements included in the logic circuit region LC may be electrically connected to the pixel array PA to provide a signal to each unit pixel of the pixel array PA or control an output signal.

In the logic circuit region LC, for example, the control circuit 200, the ramp signal generator 250, the bias voltage generator 400, the noise compensator 10, the conversion block 300, and the buffer 190 described with reference to FIG. 2 may be disposed. In the logic circuit region LC, for example, blocks other than the pixel array 100 among the blocks of FIG. 2 may be disposed.

The second peripheral region PH2 may be disposed in a part of the second region R2 that corresponds to the first peripheral region PH1, but embodiments are not limited thereto.

Figure 4:
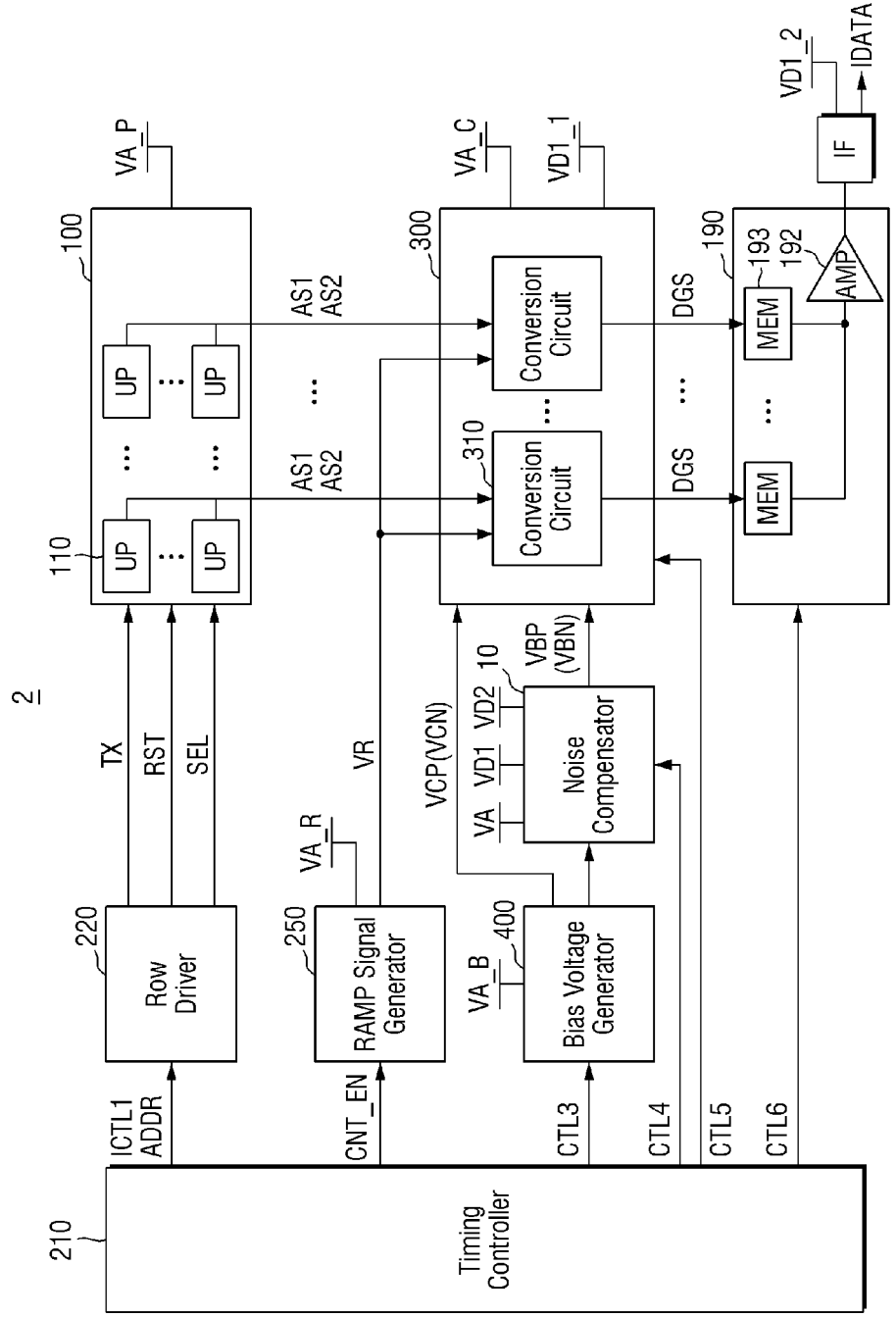
FIG. 4 is a block diagram of the image sensor according to the embodiments.

FIG. 4 is a block diagram of the image sensor 2 according to the embodiments.

Referring to FIG. 4, the image sensor 2 may include the pixel array 100, the control circuit 200, the ramp signal generator 250, the bias voltage generator 400, the noise compensator 10, the conversion block 300, the buffer 190, and an interface IF.

The control circuit 200 may include a timing controller 210 and a row driver 220. The pixel array 100 may include a plurality of unit pixels 110 (UPs) arranged in a matrix including a plurality of rows and a plurality of columns. The conversion block 300 may include a plurality of conversion circuits 310 connected to the unit pixels 110 of the pixel array 100 through corresponding column lines. The buffer 190 may include a plurality of memories 193 (MEMS) storing the digital signal DGS received from each of the conversion circuits 310. In addition, the buffer 190 may include a sense amplifier 192 (AMP) that senses and amplifies the digital signal DGS stored in each of the memories 193 and outputs the amplified digital signal DGS as the image data IDATA. The interface IF may send the image data IDATA to an external device.

The ramp signal generator 250 may operate using an analog signal processing voltage VA_R. The bias voltage generator 400 may operate using an analog signal processing voltage VA_B. The pixel array 100 may operate using an analog signal processing voltage VA_P. The conversion block 300 may operate using an analog signal processing voltage VA_C and a first digital signal processing voltage VD1_1. The interface IF may operate using a first digital signal processing voltage VD1_2.

The noise compensator 10 may sample an analog signal processing voltage VA, a first digital signal processing voltage VD1 and a second digital signal processing voltage VD2 to add noise to the bias voltage VBP. That is, the noise compensator 10 may use all power supply voltages including the analog signal processing voltage VA, the first digital signal processing voltage VD1, and the second digital signal processing voltage VD2.

Here, the magnitude of the first digital signal processing voltage VD1 and the magnitude of the second digital signal processing voltage VD2 may be smaller than the magnitude of the analog signal processing voltage VA. For example, the magnitude of the analog signal processing voltage VA may be 1.0 V, but the magnitude of the first digital signal processing voltage VD1 and the magnitude of the second digital signal processing voltage VD2 may be 2.8 V.

Each element may use a different power supply voltage. However, embodiments are not limited thereto, and the elements may also use a common power supply voltage.

For example, the analog signal processing voltage VA may include the analog signal processing voltage VA_P, the analog signal processing voltage VA_R, the analog signal processing voltage VA_B, and the analog signal processing voltage VA_C. That is, the analog signal processing voltage VA_P, the analog signal processing voltage VA_R, the analog signal processing voltage VA_B, and the analog signal processing voltage VA_C may be the same. In addition, for example, the first digital signal processing voltage VD1 may include the first digital signal processing voltage VD1_1 and the first digital signal processing voltage VD1_2. That is, the first digital signal processing voltage VD1_1 and the first digital signal processing voltage VD1_2 may be the same.

The timing controller 210 may provide a first internal control signal ICTL1 and an address signal ADDR to the row driver 220. The row driver 220 may control the unit pixels 110 of the pixel array 100 on a row-by-row basis based on the first internal control signal ICTL and the address signal ADDR. For example, the row driver 220 may control the operation of the unit pixels 110 of the pixel array 100 on a row-by-row basis by providing a row select signal SEL, a reset control signal RST and a transfer control signal TX to the pixel array 100.

The pixel array 100 may generate a first analog signal AS1 indicating a reset component and a second analog signal AS2 indicating an image component based on the row select signal SEL, the reset control signal RST and the transfer control signal TX received from the row driver 220. Due to a difference in unique characteristics of each unit pixel 110 or a difference in characteristics of logic for outputting the analog signal AS from each unit pixel 110, there may be a difference between the magnitudes of the analog signals AS generated from the same incident light by the unit pixels 110. Therefore, it is possible to extract an effective component of incident light by taking a difference between a reset component generated by each unit pixel 110 and an image component according to the incident light.

Each of the unit pixels 110 may sequentially generate the first and second analog signals AS1 and AS2 based on the row select signal SEL, the reset control signal RST, and the transfer control signal TX. The conversion block 300 may generate a first digital signal corresponding to the first analog signal AS1 and a second digital signal corresponding to the second analog signal AS2 and output the digital signal DGS indicating a difference between the first and second digital signals. That is, the digital signal DGS may indicate an effective component of incident light.

Figure 5:
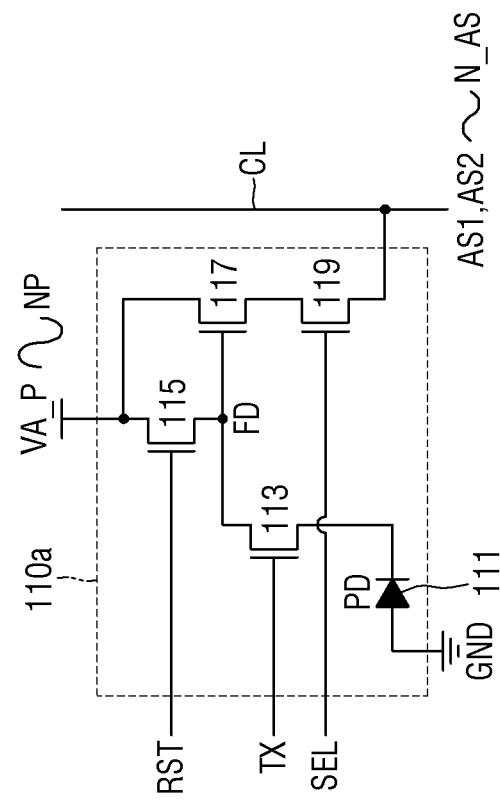
FIGS. 5 and 6 are circuit diagrams of unit pixels of FIG. 4.
Figure 6:
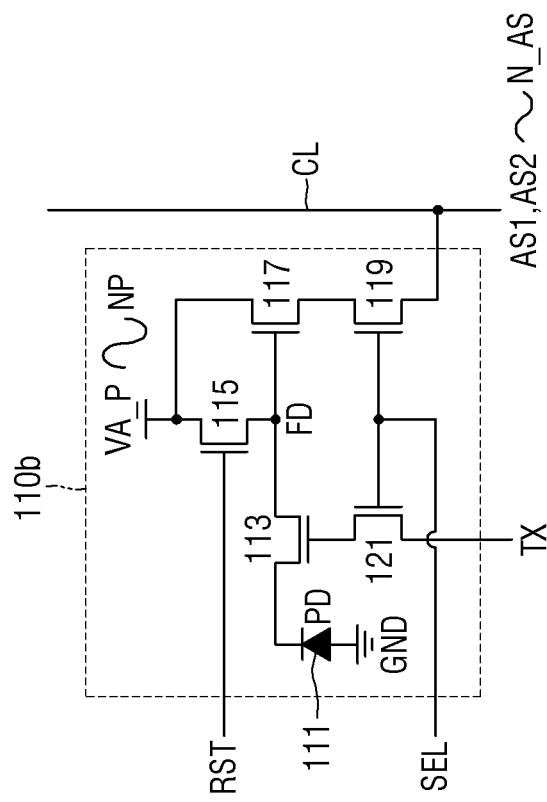

FIGS. 5 and 6 are circuit diagrams of the unit pixels 110 of FIG. 4.

Referring to FIG. 5, a unit pixel 110a may include a light sensing element 111, a transfer transistor 113, a reset transistor 115, a sensing transistor 117, and a select transistor 119.

A first terminal of the light sensing element 111 (PD) may be connected to a ground voltage GND. The light sensing element 111 may convert incident light into an electrical signal. The transfer transistor 113 may be connected to a second terminal of the light sensing element 111 and a floating diffusion node FD. The reset transistor 115 may be connected between the analog signal processing voltage VA_P and the floating diffusion node FD. The sensing transistor 117 may be connected to the analog signal processing voltage VA_P and the floating diffusion node FD. The select transistor 119 may be connected to a column line CL corresponding to the sensing transistor 117.

Referring to FIG. 6, a unit pixel 110b of FIG. 6 may further include a transistor 121, unlike the unit pixel 110a of FIG. 5. A first terminal of the transistor 121 may be connected to a gate of a transfer transistor 113, a gate of the transistor 121 may be connected to a gate of a select transistor 119, and a second terminal of the transistor 121 may receive the transfer control signal TX.

Referring again to FIGS. 4 and 5, the light sensing element 111 may generate electron-hole pairs by sensing incident light, and the generated electrical signal may be accumulated in a source node of the transfer transistor 113.

The select transistor 119 may be turned on by the select control signal SEL, and one of the rows included in the pixel array 100 may be selected. An activated reset control signal RST may be provided to the selected row, thereby turning on the reset transistor 115. Accordingly, an electric potential of the floating diffusion node FD may become the analog signal processing voltage VA_P. Then, the sensing transistor 117 may be turned on, and thus the first analog signal AS1 indicating a reset component may be output from the unit pixel 110a. After that, the reset control signal RST may be deactivated.

The transfer transistor 113 may be turned on by the transfer control signal TX, and electrons of the electron-hole pairs accumulated in the source node of the transfer transistor 113 may be transferred to the floating diffusion node FD. The electric potential of the floating diffusion node FD may vary according to the amount of electrons in the received electron-hole pairs, and at the same time, the electric potential of a gate of the sensing transistor 117 may also vary. When the select transistor 119 is turned on, the second analog signal AS2 corresponding to the electric potential of the floating diffusion node FD may be output from the unit pixel 110a.

That is, the first analog signal AS1 and the second analog signal AS2 may be sequentially output on a row-by-row basis.

Referring to FIG. 4, the timing controller 210 may control the operation of the ramp signal generator 250 by providing a count enable signal CNT_EN to the ramp signal generator 250. The ramp signal generator 250 may generate a ramp signal VR that falls with a slope of a magnitude during an active period in which the count enable signal CNT_EN is enabled.

Figure 7:
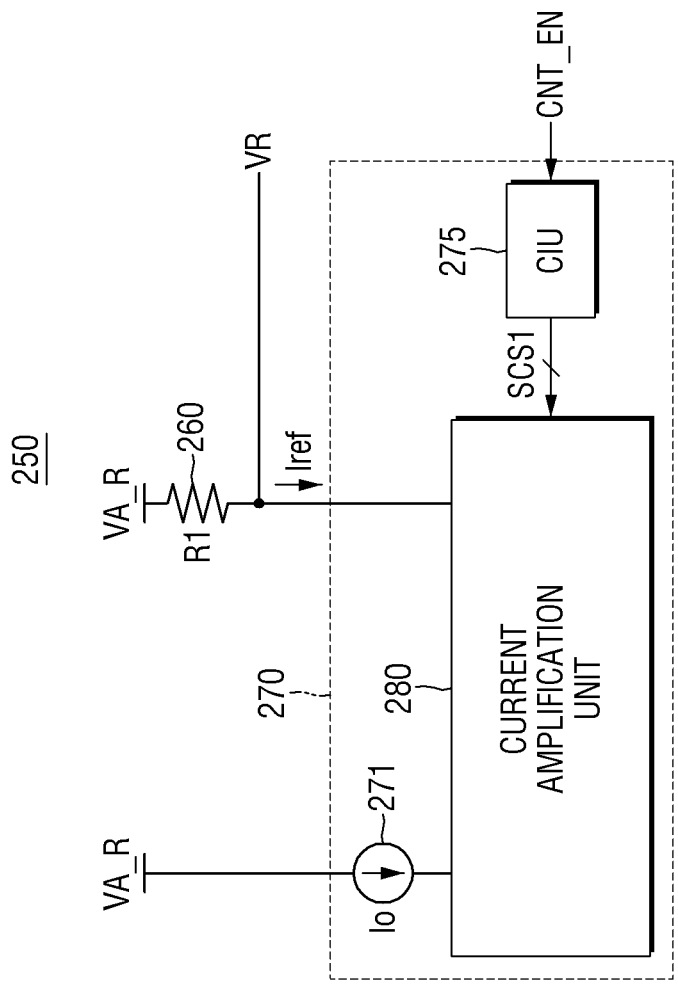
FIG. 7 is a circuit diagram of a ramp signal generator of FIG. 4.

FIG. 7 is a circuit diagram of the ramp signal generator 250 of FIG. 4.

Referring to FIG. 7, the ramp signal generator 250 may include a resistor 260 and a current generator 270. The resistor 260 may be connected between the analog signal processing voltage VA_R and the current generator 270. The resistor 260 may have a resistance value R1.

The current generator 270 may be connected between the resistor 260 and the analog signal processing voltage VA_R. The current generator 270 may receive the count enable signal CNT_EN from the control circuit 200. The current generator 270 may generate a reference current Iref that increases at a constant speed during the active period in which the count enable signal CNT_EN is enabled.

The current generator 270 may include a constant current source 271, a current amplification unit 280, and a current control unit 275. The constant current source 271 may generate a constant current Io of a magnitude. The current amplification unit 280 may amplify the magnitude of the constant current Io based on an amplification control signal SCS1 received from the current control unit 275. The current amplification unit 280 may include a plurality of switches and a plurality of current mirrors.

The current control unit 275 may generate the amplification control signal SCS1 based on the count enable signal CNT_EN and selectively open and close the switches by providing the amplification control signal SCS1 to the switches, thereby adjusting the magnitude of the reference current Iref flowing through the resistor 260.

The ramp signal generator 250 may output the ramp signal VR from a node to which the resistor 260 and the current amplification unit 280 are connected.

Referring again to FIG. 4, the timing controller 210 may control the operation of the bias voltage generator 400 by providing the third control signal CTL3 to the bias voltage generator 400. The bias voltage generator 400 may generate a cascode voltage VCP or VCN based on the third control signal CTL3 and provide the generated cascode voltage VCP or VCN to the conversion block 300.

The timing controller 210 may control the operation of the noise compensator 10 by providing the fourth control signal CTL4 to the noise compensator 10. For example, the noise compensator 10 may adjust noise added to the bias voltage VBP based on the fourth control signal CTL4.

The timing controller 210 may control the operation of the conversion block 300 by providing the fifth control signal CTL5 to the conversion block 300. The fifth control signal CTL5 may be a signal that toggles only during the active period in which the count enable signal CNT_EN is enabled.

The timing controller 210 may control the operation of the buffer 190 by providing the sixth control signal CTL6 to the buffer 190. The buffer 190 may output the digital signal DGS received from the conversion block 300 as the image data DATA based on the sixth control signal CTL6.

Figure 8:
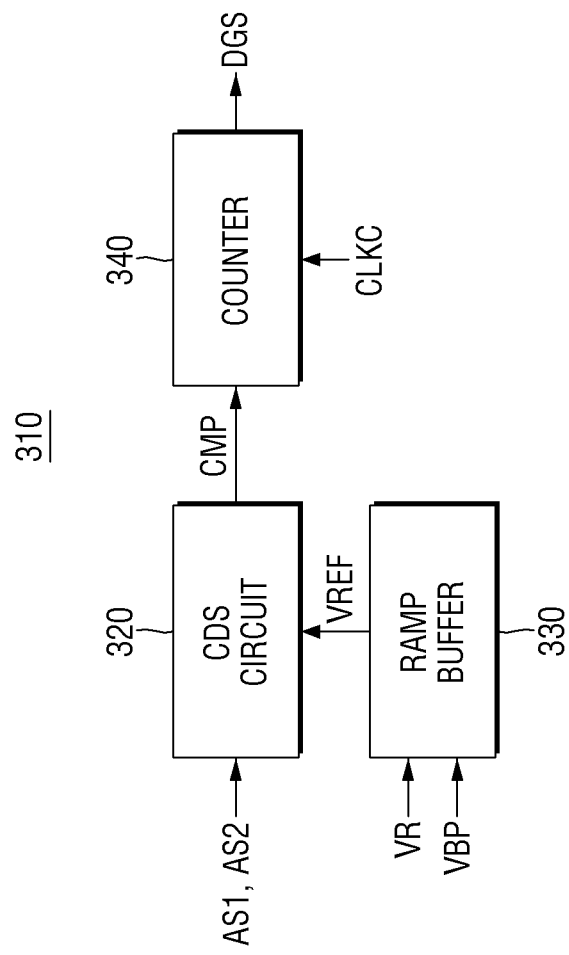
FIG. 8 is a block diagram of a conversion circuit of FIG. 4.

FIG. 8 is a block diagram of the conversion circuit 310 of FIG. 4.

Referring to FIG. 8, the conversion circuit 310 may include a correlated double sampling (CDS) circuit 320, a ramp buffer 330, and a counter 340.

The ramp buffer 330 may receive the ramp signal VR and the bias voltage VBP. The ramp buffer 330 may generate a reference voltage VREF based on the ramp signal VR and the bias voltage VBP. However, embodiments are not limited thereto, and the ramp buffer 330 may also not be included in the conversion circuit 310 but may be included in another element. For example, the ramp buffer 330 may be included in the bias voltage generator 400 or the ramp signal generator 250.

The CDS circuit 320 may perform correlated double sampling on each of the first analog signal AS1 and the second analog signal AS2 using the reference voltage VREF and generate a reset signal corresponding to a reset component and an image signal corresponding an image component. The CDS circuit 320 may compare the magnitude of each of the reset signal and the image signal with the magnitude of the reference voltage VREF and output a comparison signal CMP. For example, when the reset signal or the image signal is smaller than the reference signal VREF, the CDS circuit 320 may output the comparison signal CMP having a logic high level. In addition, for example, when the reset signal or the image signal is equal to or greater than the reference voltage VREF, the CDS circuit 320 may output the comparison signal CMP having a logic low level.

The counter 340 may generate the digital signal DGS based on the comparison signal CMP and a count clock signal CLKC. For example, when the CDS circuit 320 outputs the comparison signal CMP by performing a correlated double sampling operation on the reset component, the counter 340 may generate a first count value by performing a counting operation in synchronization with the count clock signal CLKC until the comparison signal CMP transits to a logic low level. For example, when the CDS circuit 320 outputs the comparison signal CMP by performing a correlated double sampling operation on the image component, the counter 340 may generate a second count value by performing a counting operation in synchronization with the count clock signal CLKC until the comparison signal CMP transits to a logic low level. The counter 340 may generate the digital signal DGS by subtracting the first count value from the second count value.

Figure 9:
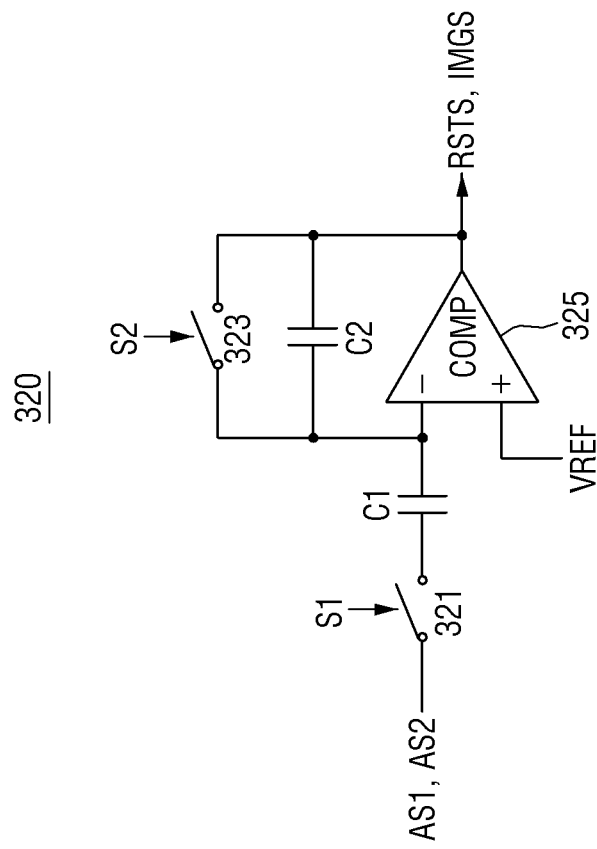
FIG. 9 is a circuit diagram of a CDS circuit of FIG. 8.

FIG. 9 is a circuit diagram of the CDS circuit 320 of FIG. 8.

Referring to FIG. 9, the CDS circuit 320 may include a comparator 325, a first capacitor C1, a second capacitor C2, a first switch 321, and a second switch 323.

The first switch 321 may control the provision of the first analog signal AS1 and the second analog signal AS2 to the first capacitor C1 based on a first switching control signal S1. The first capacitor C1 may be connected between the first switch 321 and a negative input terminal of the comparator 325. The first capacitor C1 may sample the first analog signal AS1 or the second analog signal AS2.

The second switch 323 may be connected between the negative input terminal of the comparator 325 and an output terminal of the comparator 325. The second switch 323 may be opened or closed based on a second switching control signal S2. The second capacitor C2 may be connected in parallel to the second switch 323.

The reference voltage VREF may be applied to a positive input terminal of the comparator 325. That is, the ramp buffer 330 may be connected to the comparator 325. The CDS circuit 320 may determine voltage levels of a reset signal RSTS and an image signal IMGS based on the reference voltage VREF.

Figure 10:
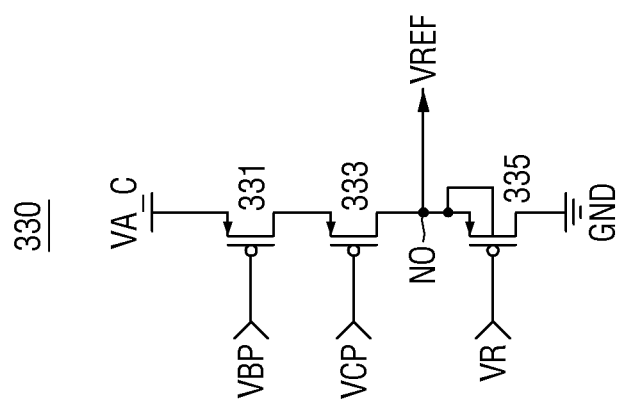
FIG. 10 is a circuit diagram of a ramp buffer of FIG. 8.

FIG. 10 is a circuit diagram of the ramp buffer 330 of FIG. 8.

Referring to FIG. 10, the ramp buffer 330 may include first through third p-channel metal oxide semiconductor (PMOS) transistors 331, 333 and 335 connected in series between the analog signal processing voltage VA_C and the ground voltage GND.

The first PMOS transistor 331 may include a source connected to the analog signal processing voltage VA_C, a gate receiving the bias voltage VBP, and a drain connected to the second PMOS transistor 333. The second PMOS transistor 333 may include a source connected to the first PMOS transistor 331, a gate receiving the cascode voltage VCP, and a drain connected to the third PMOS transistor 335 at an output node NO. The third PMOS transistor 335 may include a source connected to the second PMOS transistor 333 at the output node NO, a gate receiving the ramp signal VR, and a drain connected to the ground voltage GND. The body of the third PMOS transistor 335 may be connected to the source. In addition, the reference voltage VREF may be provided by the output node NO.

Figure 11:
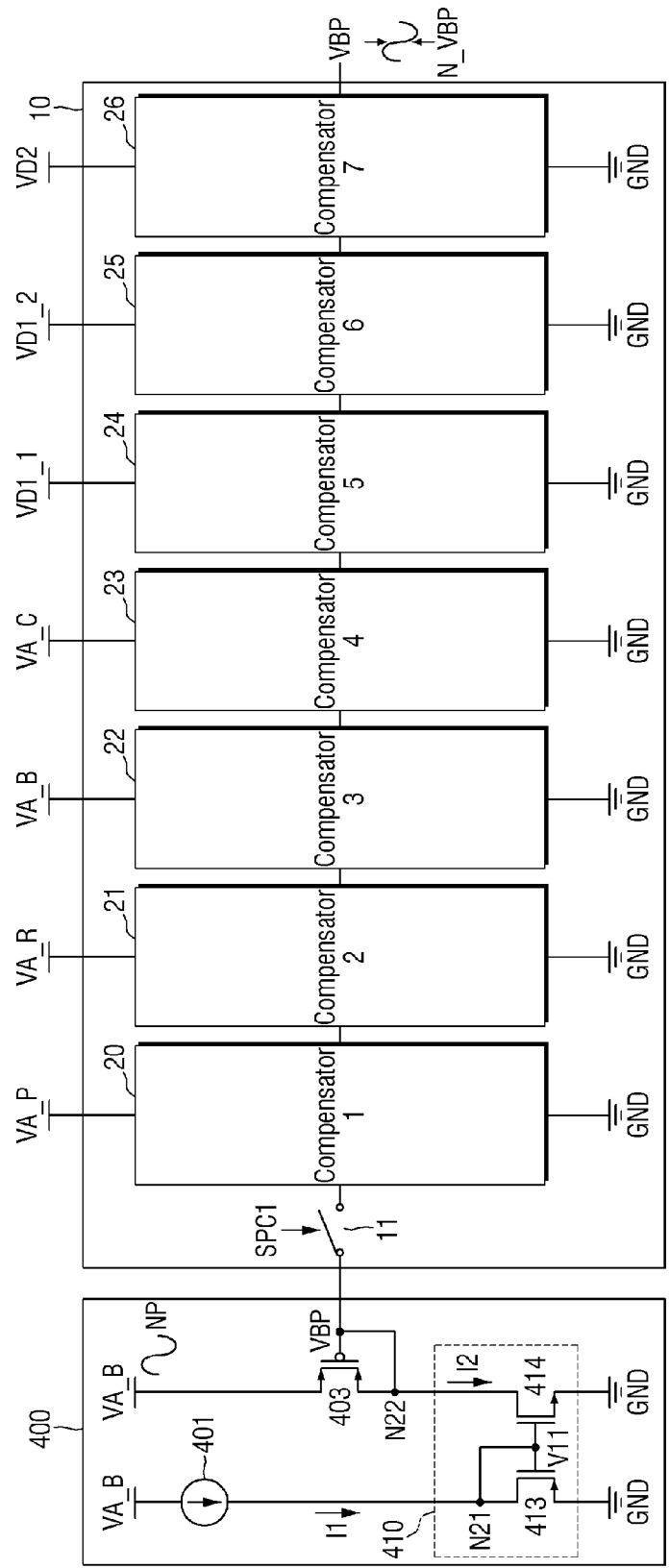
FIG. 11 is a circuit diagram of a noise compensator according to embodiments.
Figure 12:
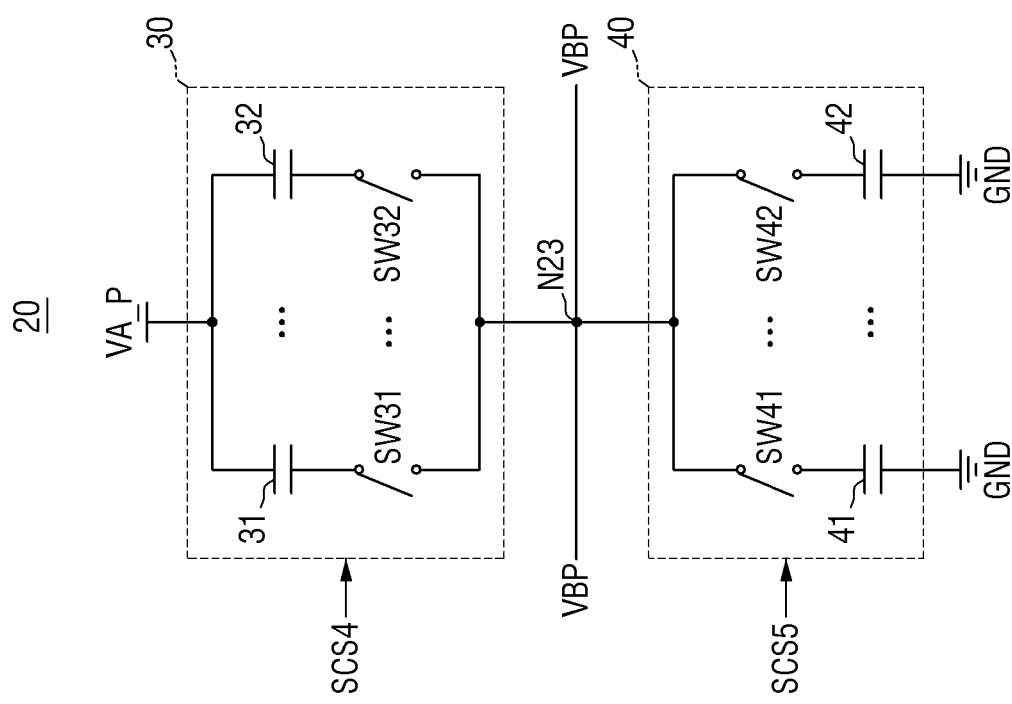
FIG. 12 is a circuit diagram of a first compensator of FIG. 11.
Figure 13:
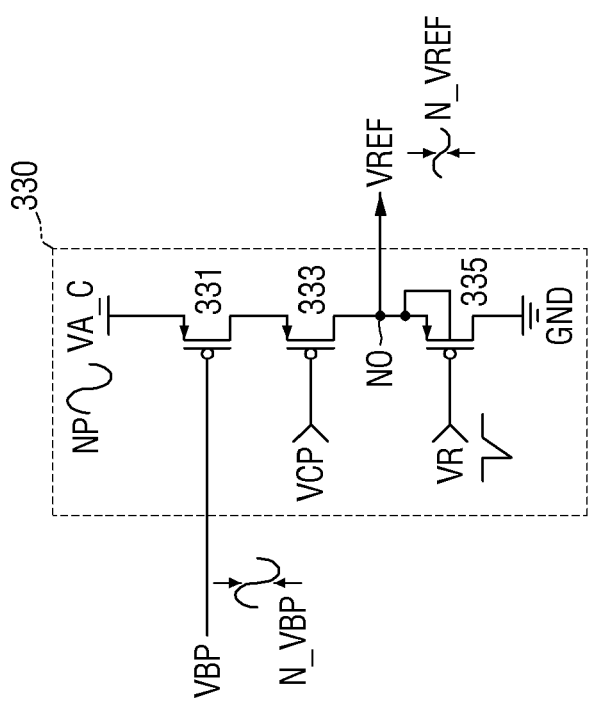
FIG. 13 is a circuit diagram of the ramp buffer that generates a reference voltage VREF, using a bias voltage VBP, according to embodiments.

FIG. 11 is a circuit diagram of the noise compensator 10 according to embodiments. FIG. 12 is a circuit diagram of a first compensator 20 of FIG. 11. FIG. 13 is a circuit diagram of the ramp buffer 330 that generates the reference voltage VREF, using the bias voltage VBP, according to embodiments.

Referring to FIG. 11, the bias voltage generator 400 may be connected to the noise compensator 10. That is, the bias voltage VBP output from the bias voltage generator 400 may be added with a noise component through the noise compensator 10 and then provided to the conversion block 300.

A current source 401 may be connected to the analog signal processing voltage VA_B to output a first current I1 having a magnitude to a first node N21. A current mirror 410 may be connected to the first node N21, a second node N22, and the ground voltage GND. The current mirror 410 may include a plurality of transistors 413 and 414. The current mirror 410 may mirror the first current I1 and output a second current I2 having the same magnitude as the first current I1 to the second node N22. A PMOS transistor 403 may include a source connected to the analog signal processing voltage VA_B and a gate and a drain connected to the second node N22. The PMOS transistor 403 may provide the bias voltage VBP based on the second current I2 to the conversion block 300.

Here, the analog signal processing voltage VA_B may include a first noise component NP. That is, the bias voltage VBP generated by the bias voltage generator 400 may include a second noise component N_VBP, and the second noise component N_VBP may be affected by the first noise component NP.

A sampling switch 11 may be connected between the second node N22 and the first compensator 20. The sampling switch 11 may switch the bias voltage VBP to a third node N23 in response to a sampling control signal SPC1.

The noise compensator 10 may include a plurality of compensators. First through seventh compensators 20 through 26 may be connected in series between the sampling switch 11 and the ramp buffer 330. However, embodiments are not limited thereto, and the first through seventh compensators 20 through 26 may not necessarily be connected in series but may also be arranged in other forms.

The first compensator 20 may be connected to the analog signal processing voltage VA_P to sample the bias voltage VBP using the analog signal processing voltage VA_P. The second compensator 21 may be connected to the analog signal processing voltage VA_R to sample the bias voltage VBP using the analog signal processing voltage VA_R. The third compensator 22 may be connected to the analog signal processing voltage VA_B to sample the bias voltage VBP using the analog signal processing voltage VA_B. The fourth compensator 23 may be connected to the analog signal processing voltage VA_C to sample the bias voltage VBP using the analog signal processing voltage VA_C.

The fifth compensator 24 may be connected to the digital signal processing voltage VD1_1 to sample the bias voltage VBP using the digital signal processing voltage VD1_1. The sixth compensator 25 may be connected to the digital signal processing voltage VD1_2 to sample the bias voltage VBP using the digital signal processing voltage VD1_2. The seventh compensator 26 may be connected to the digital signal processing voltage VD2 to sample the bias voltage VBP using the digital signal processing voltage VD2. That is, the noise compensator 10 may use all power supply voltages included in the image sensing system 1.

Referring to FIG. 12, the first compensator 20 may include a first sampler 30 and a second sampler 40. The first sampler 30 may be connected between the analog signal processing voltage VA_P and the third node N23 and may sample and store a first portion of the bias voltage VBP in response to a first switching control signal SCS4. The second sampler 40 may be connected between the third node N23 and the ground voltage GND and may sample and store a second portion of the bias voltage VBP in response to a second switching control signal SCS5.

The first sampler 30 may include first capacitors 31 through 32 connected in parallel to the analog signal processing voltage VA and first switches SW31 through SW32 connected in parallel between the first capacitors 31 through 32 and the third node N23. A plurality of bits of the first switching control signal SCS4 may be applied to the first switches SW31 through SW32. For example, respective capacitances of the first capacitors 31 through 32 may be the same.

The second sampler 40 may include second switches SW41 through SW42 connected in parallel to the third node N23 and second capacitors 41 through 42 connected in parallel between the second switches SW41 through SW42 and the ground voltage GND. A plurality of bits of the second switching control signal SCS5 may be applied to the second switches SW41 through SW42. For example, respective capacitances of the second capacitors 41 through 42 may be the same.

A ratio of the first portion of the bias voltage VBP stored in the first capacitors 31 through 32 to the second portion of the bias voltage VBP stored in the second capacitors 41 through 42 may vary according to a combination of the bits of the first switching control signal SCS4 and the bits of the second switching control signal SCS5.

Assuming that a noise component is not included in the ground voltage GND, the magnitude of the second noise component N_VBP of the bias voltage VBP may vary according to the ratio of the magnitude of the first portion of the bias voltage VBP stored in the first sampler 30 to the magnitude of the second portion of the bias voltage VBP stored in the second sampler 40. Accordingly, the magnitude of a third noise component N_VREF of the reference voltage VREF may also vary.

Referring to FIG. 13, as the magnitude of the second noise component N_VBP of the bias voltage VBP varies, the magnitude of the third noise component N_VREF of the reference voltage VREF may also vary. Here, the magnitude of the second noise component N_VBP of the bias voltage VBP may be adjusted using the analog signal processing voltage VA, the first digital signal processing voltage VD1, and the second digital signal processing voltage VD2 in the noise compensator 10.

Referring again to FIG. 11, the noise compensator 10 may include the compensators 20 through 26 using different voltages. That is, the magnitude of the second noise component N_VBP of the bias voltage VBP may be changed using all of the compensators 20 through 26. That is, the noise compensator 10 may adjust the magnitude of the second noise component N_VBP of the bias voltage VBP using the analog signal processing voltage VA, the first digital signal processing voltage VD1, and the second digital signal processing voltage VD2.

Because the noise compensator 10 adjusts the magnitude of the second noise component N_VBP using not only the analog signal processing voltage VA used to process an analog signal but also the digital signal processing voltages VD1 and VD2 used to process a digital signal (i.e., using the sampled voltages or noise), the digital signal DSG and the image data DATA output from the image sensor 2 can be further improved by having less power noise.

Figure 14:
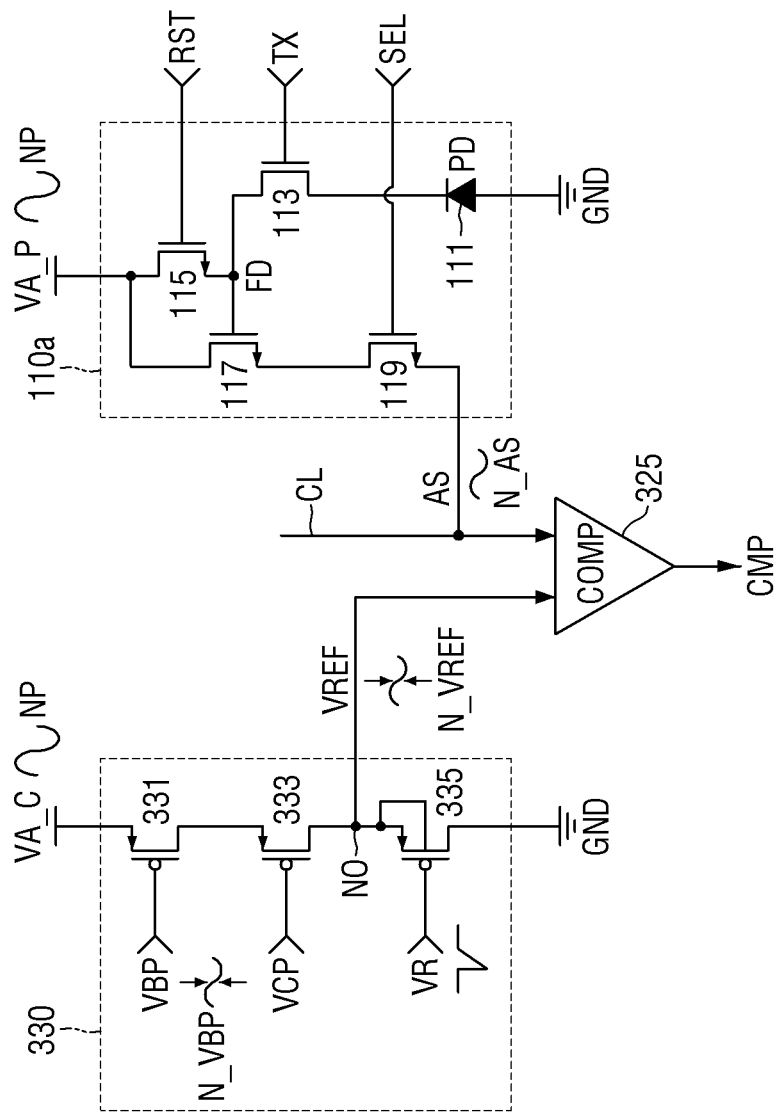
FIG. 14 is a circuit diagram of a comparator that generates a comparison signal CMP, using a reference voltage VREF, according to embodiments.
Figure 15:
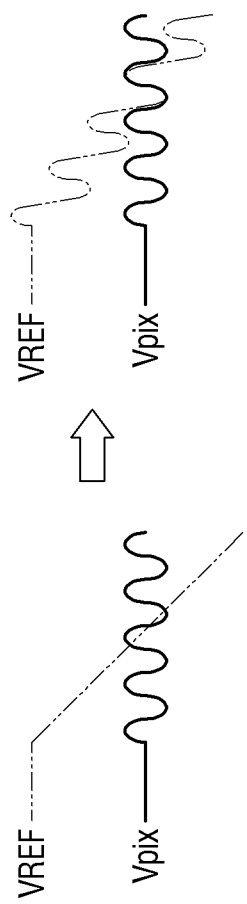
FIG. 15 is a graph illustrating noise compensation by a noise compensator, according to embodiments.

FIG. 14 is a circuit diagram of the comparator 325 that generates a comparison signal CMP, using a reference voltage VREF, according to embodiments. FIG. 15 is a graph illustrating noise compensation by the noise compensator 10, according to embodiments.

Referring to FIG. 14, the unit pixel 110a and the ramp buffer 330 may be connected to the CDS circuit 320. The analog signal processing voltage VA_C used by the ramp buffer 330 may include the first noise component NP, and the bias voltage VBP applied to the first PMOS transistor 331 of the ramp buffer 330 may include the second noise component N_VBP. The magnitude of the third noise component N_VREF of the reference voltage VREF generated by the ramp buffer 330 using the analog signal processing voltage VA_C and the bias voltage VBP may be equal to the magnitude of a noise component N_AS of the analog signal AS output from the unit pixel 110a. That is, the magnitude of the third noise component N_VREF of the reference voltage VREF may be adjusted to be equal to the magnitude of the noise component N_AS of the analog signal AS.

The comparator 325 of the CDS circuit 320 may output the comparison signal CMP by comparing the reference voltage VREF and the analog signal AS. Referring to FIG. 15, the third noise component N_VREF of the reference voltage VREF and the noise component N_AS of the analog signal AS or a pixel signal Vpix may cancel each other out. Accordingly, the comparison signal CMP may not include a noise component. In this case, the third noise component N_VREF may take into consideration not only the analog signal processing voltage VA used in an analog domain but also the first digital signal processing voltage VD1 used in a digital domain and the second digital signal processing voltage VD2 used in the image signal processor 4. Therefore, the digital signal DGS and the image data IDATA output from the image sensor 2 can be further improved.

The operation of the image sensor 2 will now be described with reference to FIGS. 1 through 16.

Figure 16:
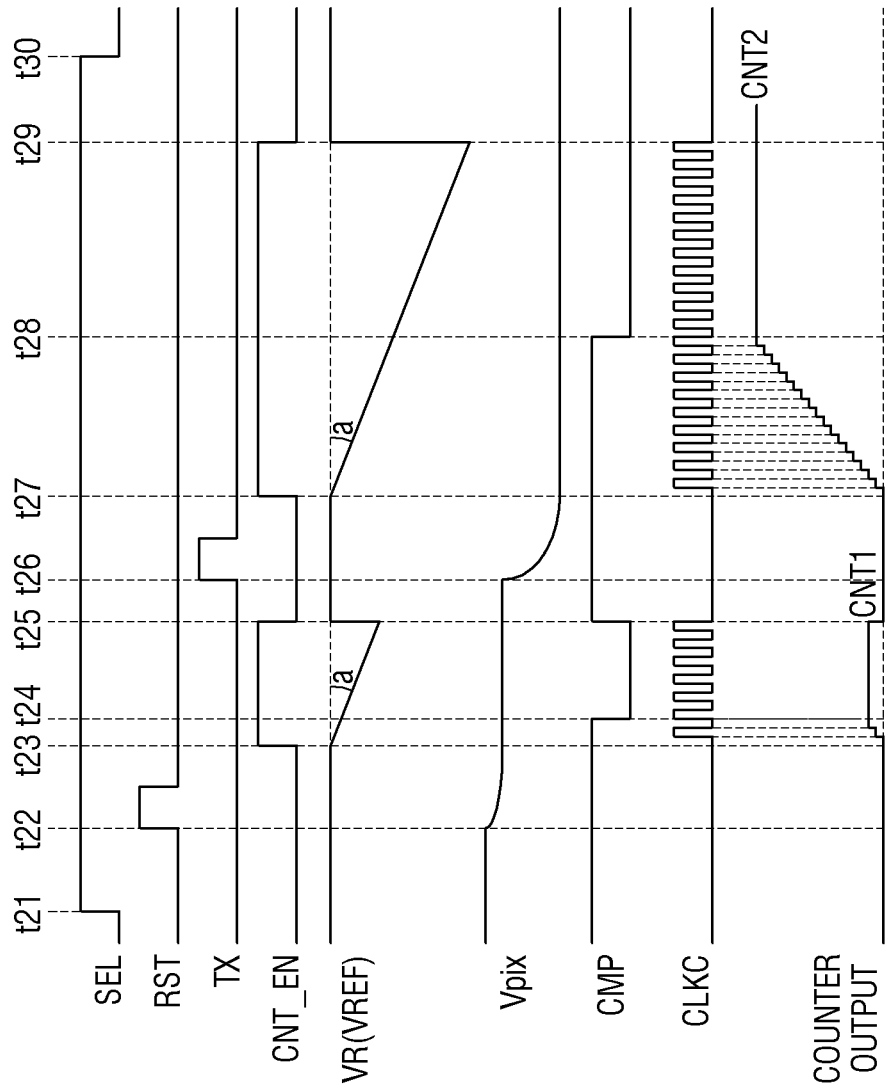
FIG. 16 is a timing diagram for explaining an operation of an image sensor, according to embodiments.

FIG. 16 is a timing diagram for explaining an operation of an image sensor, according to embodiments.

Referring to FIG. 16, at a time t21, the row driver 220 may select one of the rows included in the pixel array 100 by providing the select control signal SEL activated to a logic high level to the pixel array 100.

At a time t22, the row driver 220 provides the reset control signal RST to the selected row. At this time, the pixel voltage signal Vpix output from the pixel array 100 may be the first analog signal AS1 indicating a reset component.

At a time t23, the timing controller 210 may provide the count enable signal CNT_EN having a logic high level to the ramp signal generator 250, and the ramp signal generator 250 may reduce the voltage level of the ramp signal VR with a slope a of a magnitude. In addition, the timing controller 210 may provide the count clock signal CLKC to the counter 340, and the counter 340 may start a counting operation in synchronization with the count clock signal CLKC.

At a time t24, the voltage levels of the reference voltage VREF and the reset signal may become the same, and the comparison signal CMP output from the comparator 325 may transit to a logic low level, thereby ending the counting operation. At this time, the counter 340 may generate a first count value CNT1 corresponding to the reset signal. Here, the comparison signal CMP may not include a noise component due to the operation of the bias voltage generator 400, the noise compensator 10, and the ramp buffer 330.

At a time t25, when the count enable signal CNT_EN is deactivated to a logic low level, the ramp signal generator 250 may be disabled. A period from the time t23 to the time t25 may be a maximum period for counting the reset signal and may be set to correspond to an appropriate number of clock cycles according to the characteristics of the image sensor 2.

At a time t26, the row driver 220 may provide the transfer control signal TX to the selected row. At this time, the pixel voltage signal Vpix output from the pixel array 100 may be the second analog signal AS2 indicating an image component according to the incident light.

At a time t27, the timing controller 210 may provide the count enable signal CNT_EN having a logic high level to the ramp signal generator 250 again. The ramp signal generator 250 may start to reduce the voltage level of the ramp signal VR with the slope a of the same magnitude as that of the slope a at the time t23. In addition, the timing controller 210 may provide the count clock signal CLKC to the counter 340, and the counter 340 may start a counting operation in synchronization with the count clock signal CLKC.

At a time t28, the voltage levels of the reference voltage VREF and the image signal may become the same, and the comparison signal CMP output from the comparator 325 may transit to a logic low level, thereby ending the counting operation. At this time, the counter 340 generates a second count value CNT2 corresponding to the image signal. Here, the comparison signal CMP may not include a noise component due to the operation of the bias voltage generator 400 and the ramp buffer 330. The counter 340 may output the digital signal DGS indicating an effective component of the incident light by subtracting the first count value CNT1 from the second count value CNT2.

At a time t29, when the count enable signal CNT_EN is deactivated to a logic low level, the ramp signal generator 250 may be disabled. A period from the time t27 to the time t29 may be a maximum period for counting the image signal and may be set to correspond to an appropriate number of clock cycles according to the characteristics of the image sensor 2.

At a time t30, the row driver 220 may deselect the selected row by providing the select control signal SEL deactivated to a logic low level to the pixel array 100.

An image sensor 2b according to embodiments will now be described with reference to FIGS. 17 and 18.

Figure 17:
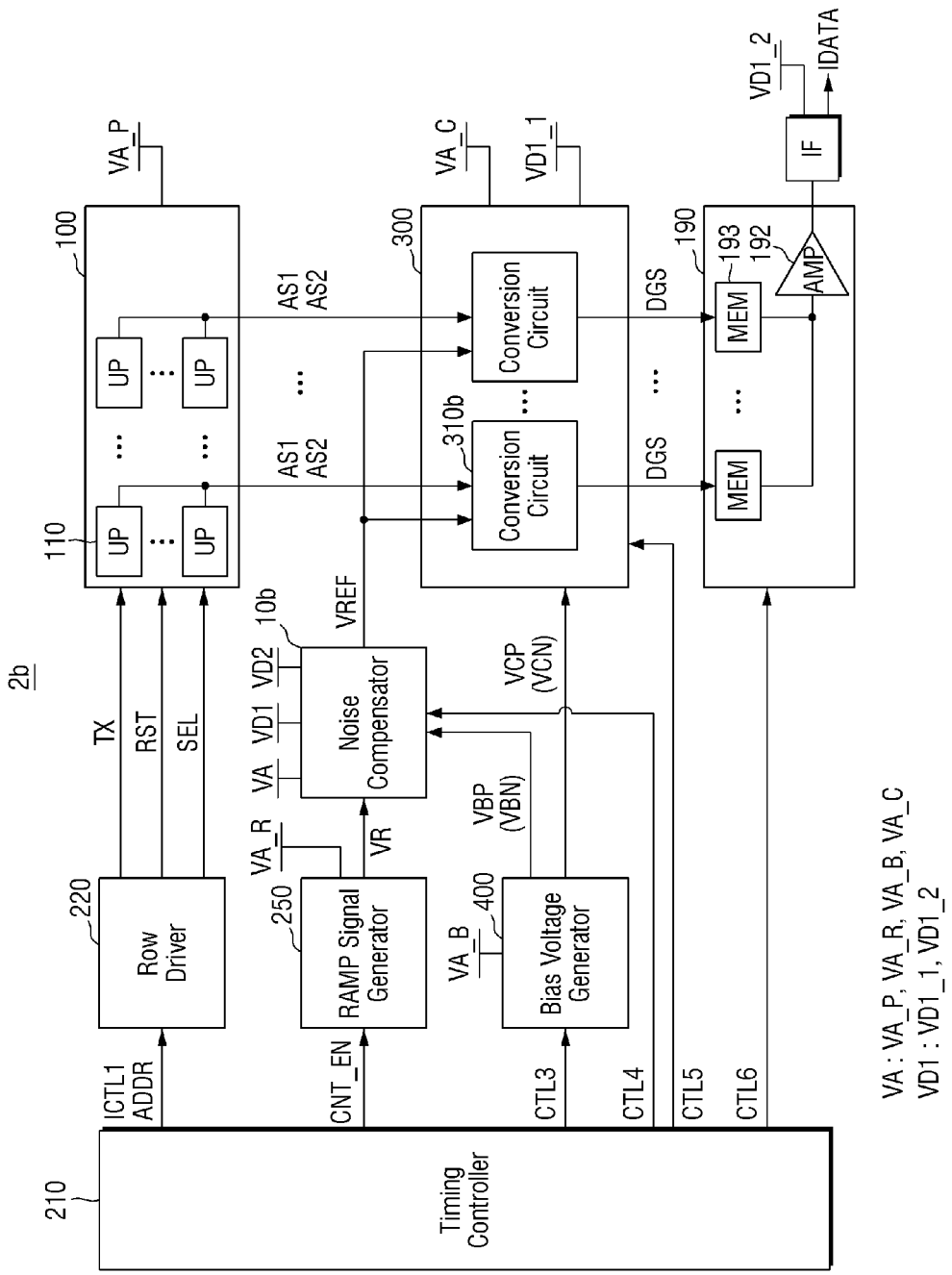
FIGS. 17 and 18 are block diagrams of an image sensor according to embodiments.
Figure 18:
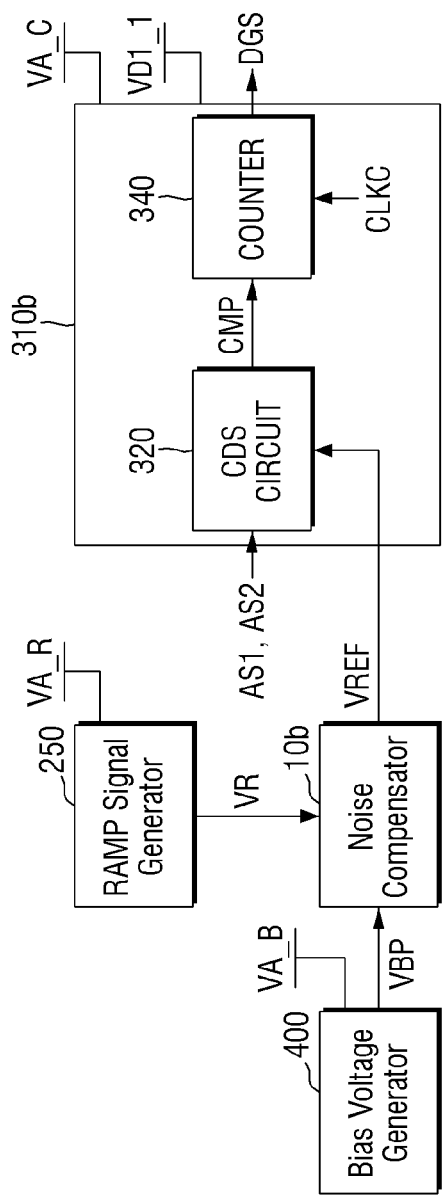

FIGS. 17 and 18 are block diagrams of the image sensor 2b according to embodiments. For ease of description, a description of the same elements and features as those described with reference to FIGS. 1 through 16 will be given briefly or omitted.

Referring to FIG. 17, a noise compensator 10b may receive a ramp signal VR from a ramp signal generator 250 and receive a bias voltage VBP from a bias voltage generator 400. The noise compensator 10b may generate a reference voltage VREF based on the received ramp signal VR and the received bias voltage VBP. In addition, the noise compensator 10b may send the generated reference voltage VREF to a conversion circuit 310b.

Referring to FIG. 18, the noise compensator 10b may receive the ramp signal VR and the bias voltage VBP and generate the reference voltage VREF in response to the ramp signal VR and the bias voltage VBP. For example, the noise compensator 10b may include the ramp buffer 330 described using FIGS. 1 through 16. The noise compensator 10b may provide the generated reference voltage VREF to the conversion circuit 310b.

The conversion circuit 310b may include a CDS circuit 320 and a counter 340. The conversion circuit 310b may not include the ramp buffer 330. The CDS circuit 320 may receive the reference voltage VREF and output a comparison signal CMP by comparing the reference voltage VREF and an analog signal AS.

That is, unlike the noise compensator 10 of the image sensor 2 described using FIGS. 1 through 16, the noise compensator 10b may generate the reference voltage VREF by itself and provide the reference voltage VREF to the conversion circuit 310b. In addition, the conversion circuit 310b may not include the ramp buffer 330. However, embodiments are not limited thereto.

An image sensor 2c according to embodiments will now be described with reference to FIGS. 19 and 20.

Figure 19:
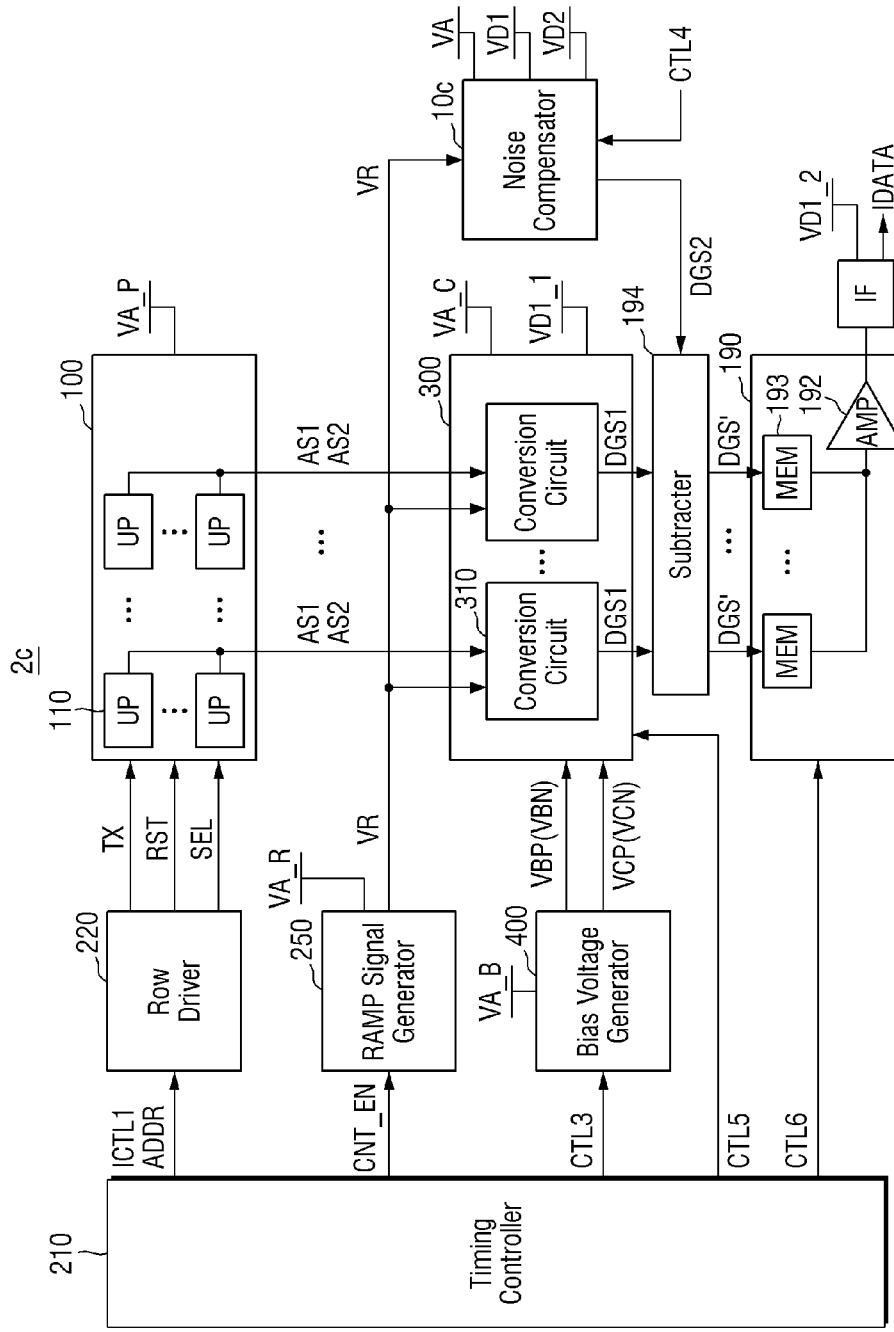
FIGS. 19 and 20 are block diagrams of an image sensor according to embodiments.
Figure 20:
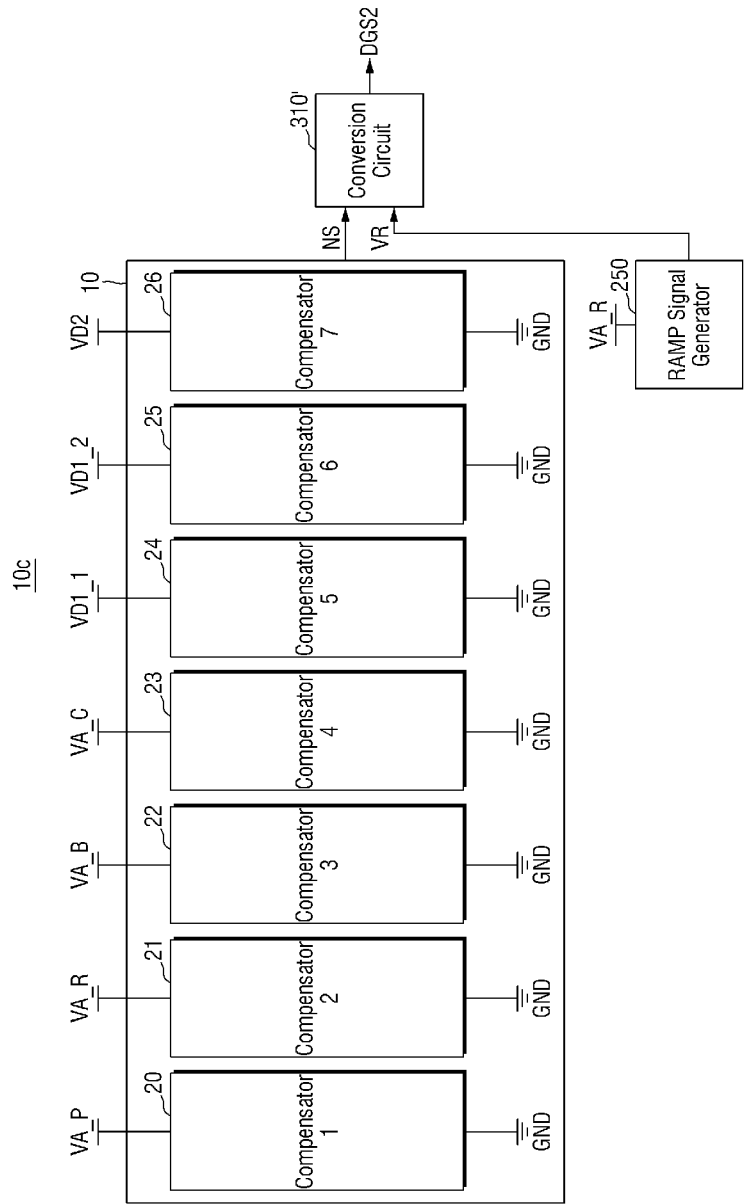

FIGS. 19 and 20 are block diagrams of the image sensor 2c according to embodiments. For ease of description, a description of the same elements and features as those described with reference to FIGS. 1 through 16 will be given briefly or omitted.

Referring to FIG. 19, the image sensor 2c may further include a noise compensator 10c connected to a ramp signal generator 250, a subtracter 194, and the like.

While the noise compensator 10 described using FIGS. 1 through 16 is connected between the bias voltage generator 400 and the conversion block 300, the noise compensator 10c may be connected between the ramp signal generator 250 and the subtracter 194.

The noise compensator 10c may receive a ramp signal VR, an analog signal processing voltage VA, a first digital signal processing voltage VD1, and a second digital signal processing voltage VD2. The noise compensator 10c may provide a second digital signal DGS2 to the subtracter 194 in response to the above signals.

A conversion circuit 310 may generate a first digital signal DGS1 in response to the ramp signal VR received from the ramp signal generator 250 and a bias voltage VBP received from a bias voltage generator 400. Here, the first digital signal DGS1 may include a noise component. That is, while the digital signal DGS described using FIGS. 1 through 16 hardly includes a noise component, the first digital signal DGS1 may include a noise component. However, embodiments are not limited thereto.

The subtracter 194 may receive the first and second digital signals DGS1 and DGS2 and generate a digital signal DGS' by subtracting the second digital signal DGS2 from the first digital signal DGS1.

Referring to FIG. 20, the noise compensator 10c may include first through seventh compensators 20 through 26. The noise compensator 10c may generate a noise signal NS based on the analog signal processing voltage VA, the first digital signal processing voltage VD1, and the second digital signal processing voltage VD2. Unlike the noise compensator 10 described using FIGS. 1 through 16, the noise compensator 10c may generate the noise signal NS by itself instead of changing a noise component of the bias voltage VBP.

The noise compensator 10c may include a conversion circuit 310'. The conversion circuit 310' may have the same structure as the conversion circuit 310 included in a conversion block 300. The conversion circuit 310' may receive the noise signal NS and the ramp signal VR and generate the second digital signal DGS2 based on the noise signal NS and the ramp signal VR. The second digital signal DGS2 may be sent to the subtracter 194.

Referring again to FIG. 19, the subtracter 194 may generate the digital signal DGS' by subtracting the second digital signal DGS2 from the first digital signal DGS1. While noise removal in the image sensor 2 described using FIGS. 1 through 16 is performed in an analog domain, noise removal in the subtracter 194 may be performed in a digital domain. Therefore, the digital signal DGS' and image data IDATA output from the image sensor 2c can be further improved.

Figure 21:
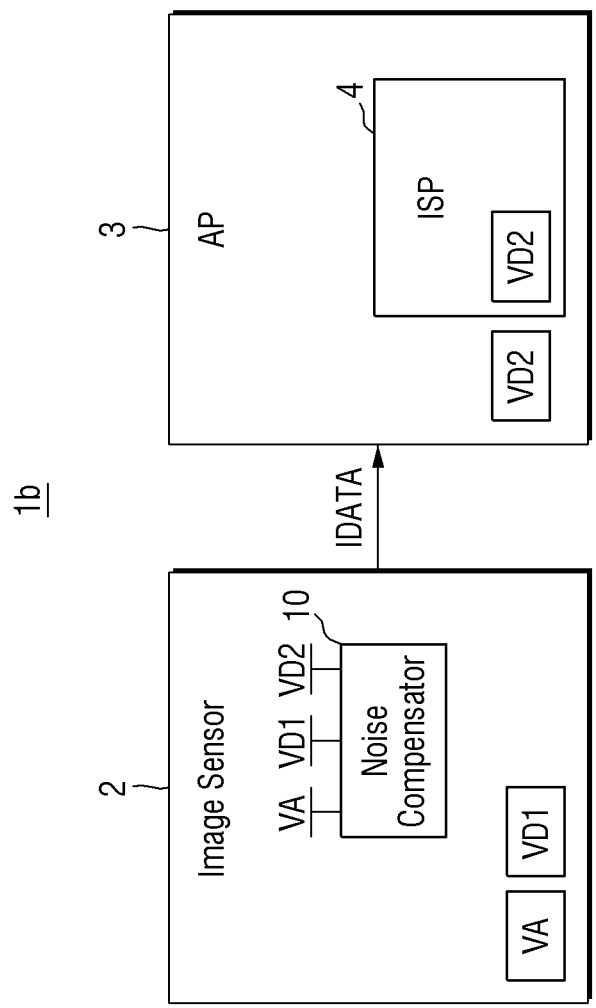
FIG. 21 is a block diagram of an image sensing system according to embodiments.

FIG. 21 is a block diagram of an image sensing system 1b according to embodiments. For ease of description, a description of the same elements and features as those described with reference to FIGS. 1 through 16 will be given briefly or omitted.

Referring to FIG. 21, the image sensing system 1b may include the image sensor 2 and an application processor 3 (AP). An image signal processor 4 may be included in the application processor 3. The application processor 3 may receive image data IDATA from the image sensor 2.

A noise compensator 10 may be included in the image sensor 2. Here, the noise compensator 10 may improve noise using a second digital signal processing voltage VD2 used by the application processor 3 or the image signal processor 4. That is, the noise compensator 10 may use voltages used not only by the image sensor 2 but also by an external device such as the application processor 3.

Figure 22:
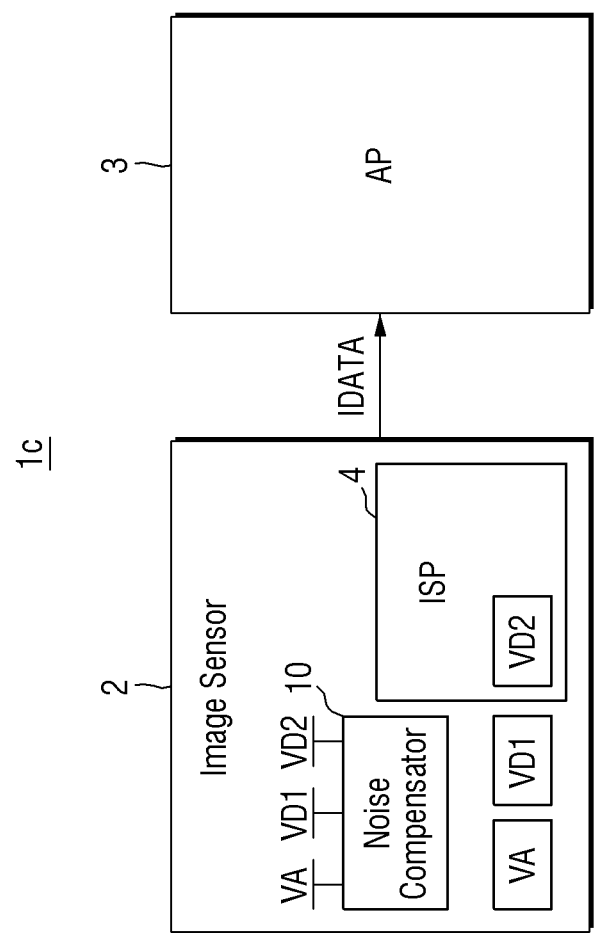
FIG. 22 is a block diagram of an image sensing system according to embodiments.

FIG. 22 is a block diagram of an image sensing system 1c according to embodiments. For ease of description, a description of the same elements and features as those described with reference to FIGS. 1 through 16 will be given briefly or omitted.

Referring to FIG. 22, the image sensing system 1c may include the image sensor 2 and an application processor 3. An image signal processor 4 may be included in the image sensor 2. The application processor 3 may receive image data IDATA from the image sensor 2.

While the image signal processor 4 is included in the application processor 3 in the image sensing system 1b of FIG. 21, the image signal processor 4 may be included in the image sensor 2. A noise compensator 10 may improve noise using an analog signal processing voltage VA, a first digital signal processing voltage VD1 and a second digital signal processing voltage VD2 used in the image sensor 2.

An electronic device 1000 according to embodiments will now be described with reference to FIGS. 23 and 24.

Figure 23:
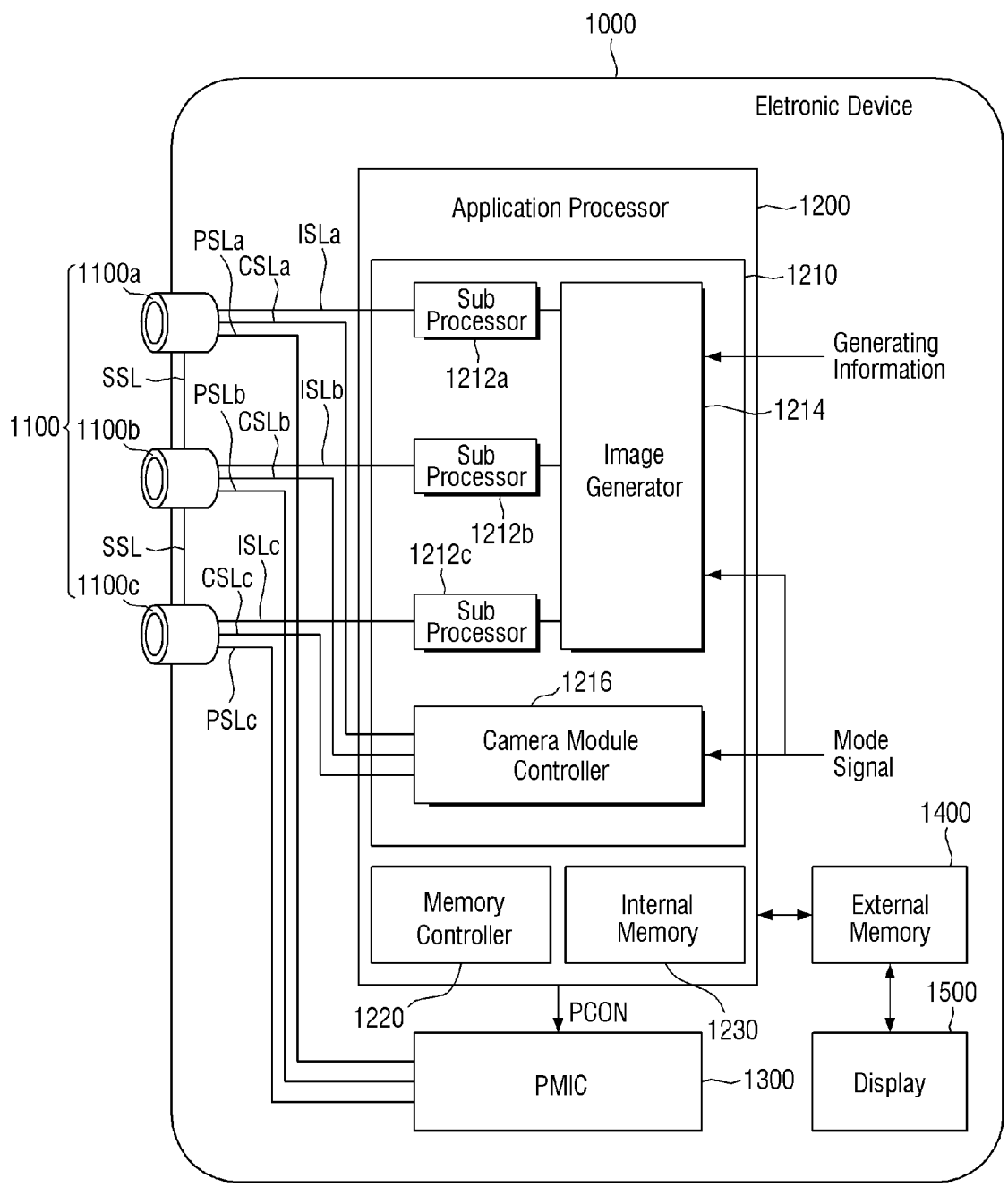
FIG. 23 is a block diagram of an electronic device including multiple camera modules, according to embodiments.

FIG. 23 is a block diagram of an electronic device 1000 including multiple camera modules 1100a through 1100c according to embodiments. FIG. 24 is a detailed block diagram of a camera module 1100b of FIG. 23. For ease of description, a description of the same elements and features as those described with reference to FIGS. 1 through 22 will be given briefly or omitted.

Referring to FIG. 23, the electronic device 1000 may include a camera module group 1100, an application processor 1200, a power management integrated circuit (PMIC) 1300, an external memory 1400, and a display 1500.

The camera module group 1100 may include a plurality of camera modules 1100a through 1100c. Although an embodiment in which three camera modules 1100a through 1100c are disposed is illustrated in the drawing, embodiments are not limited thereto. In some embodiments, the camera module group 1100 may be modified to include only two camera modules. In addition, in some embodiments, the camera module group 1100 may be modified to include n (n is a natural number of 4 or more) camera modules.

Here, one of the three camera modules 1100a through 1100c may be a camera module including the image sensor 2 described using FIGS. 1 through 22. Alternatively, one of the three camera modules 1100a through 1100c may be a camera module including the image sensor 2 and the image signal processor 4 described using FIGS. 1 through 22.

The detailed configuration of the camera module 1100b will now be described in more detail with reference to FIG. 24, but the following description may apply equally to other camera modules 1100a and 1100c according to embodiments.

Figure 24:
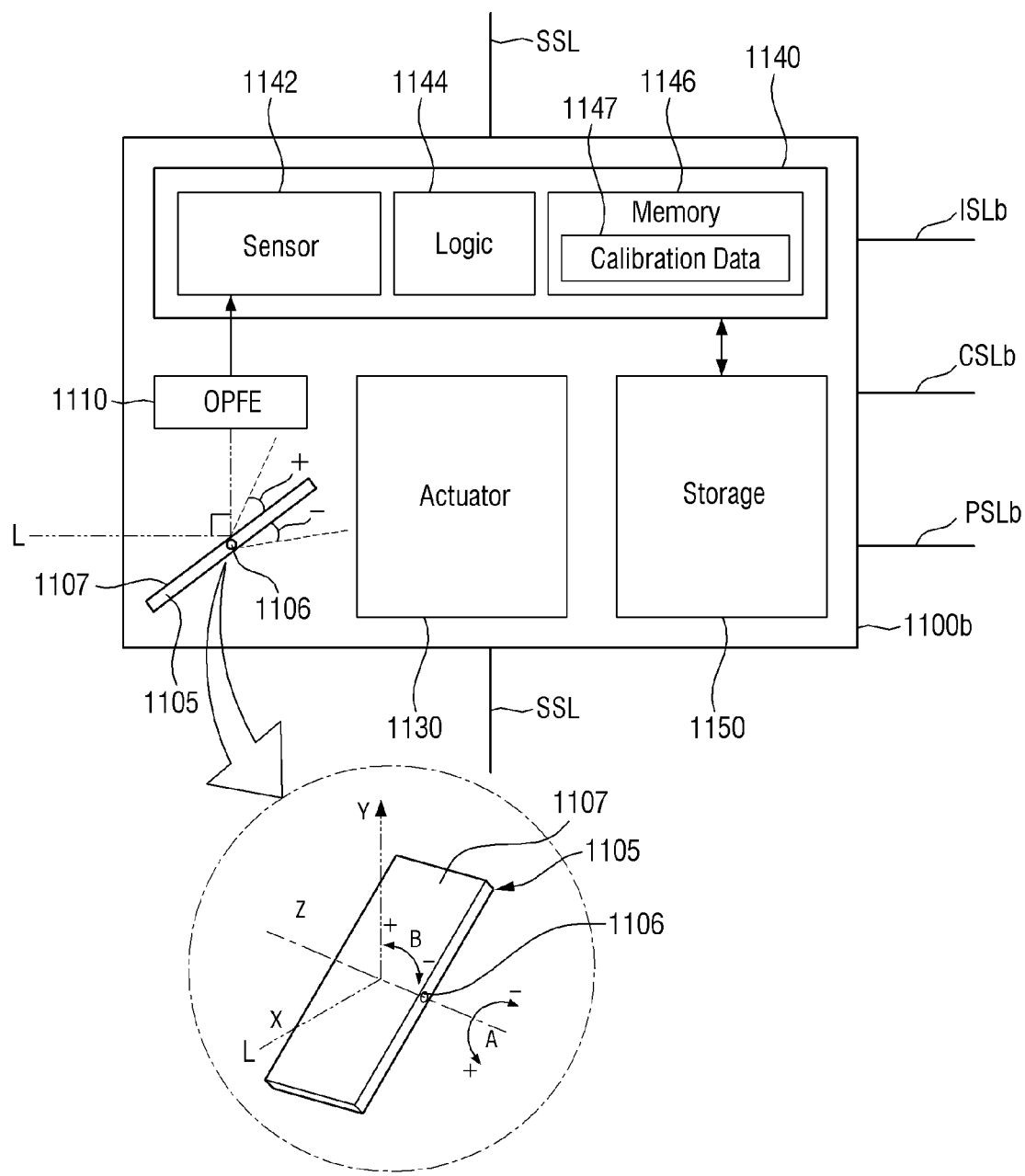
FIG. 24 is a detailed block diagram of a camera module of FIG. 23.

Referring to FIG. 24, the camera module 1100b may include a prism 1105, an optical path folding element (OPFE) 1110, an actuator 1130, an image sensing device 1140, and a storage unit 1150.

The prism 1105 may include a reflective surface 1107 of a light reflecting material to change the path of light L incident from the outside.

In some embodiments, the prism 1105 may change the path of the light L incident in a first direction X to a second direction Y perpendicular to the first direction X. In addition, the prism 1105 may change the path of the light L incident in the first direction X to the second direction Y perpendicular to the first direction X by rotating the reflective surface 1107 of the light reflecting material around a central axis 1106 in an A direction or rotating the central axis 1106 in a B direction. At this time, the OPFE 1110 may also move in a third direction Z perpendicular to the first direction X and the second direction Y.

In some embodiments, as illustrated, a maximum rotation angle of the prism 1105 in the A direction may be, but is not limited to, 15 degrees or less in a positive (+) A direction and greater than 15 degrees in a negative (−) A direction.

In some embodiments, the prism 1105 may move at an angle of about 20 degrees, 10 to 20 degrees, or 15 to 20 degrees in a positive (+) or negative (−) B direction. Here, the prism 1105 may move at the same angle in the positive (+) or negative (−) B direction or may move at almost the same angle with a difference of about 1 degree.

In some embodiments, the prism 1105 may move the reflective surface 1107 of the light reflecting material in the third direction (e.g., the Z direction) parallel to a direction in which the central axis 1106 extends.

The OPFE 1110 may include a group of m (where m is a natural number) optical lenses. The m lenses may move in the second direction Y to change an optical zoom ratio of the camera module 1100b. For example, when a basic optical zoom ratio of the camera module 1100b is Z, if the m optical lenses included in the OPFE 1110 are moved, the optical zoom ratio of the camera module 1100b may be changed to an optical zoom ratio of 3Z or 5Z or more.

The actuator 1130 may move the OPFE 1110 or the optical lenses (hereinafter, referred to as an optical lens) to a position. For example, the actuator 1130 may adjust the position of the optical lens so that an image sensor 1142 is located in a focal length of the optical lens for accurate sensing.

The image sensing device 1140 may include the image sensor 1142, a control logic 1144, and a memory 1146. The image sensor 1142 may sense an image of a sensing target using the light L provided through the optical lens. In some embodiments, the image sensor 1142 may include the image sensor 2 described above.

The control logic 1144 may control the overall operation of the camera module 1100b. For example, the control logic 1144 may control the operation of the camera module 1100b according to a control signal provided through a control signal line CSLb.

The memory 1146 may store information for the operation of the camera module 1100b, such as calibration data 1147. The calibration data 1147 may include information for the camera module 1100b to generate image data using the light L provided from the outside. The calibration data 1147 may include, for example, information about the degree of rotation described above, information about a focal length, and information about an optical axis. When the camera module 1100b is implemented as a multi-state camera whose focal length changes according to the position of the optical lens, the calibration data 1147 may include a focal length value for each position (or state) of the optical lens and information related to auto focusing.

The storage unit 1150 may store image data sensed through the image sensor 1142. The storage unit 1150 may be disposed outside the image sensing device 1140 and may be implemented in a stacked form with a sensor chip constituting the image sensing device 1140. In some embodiments, the storage unit 1150 may be implemented as, but not limited to, an electrically erasable programmable read-only memory (EEPROM).

Referring to FIGS. 23 and 24 together, in some embodiments, each of the camera modules 1100a through 1100c may include the actuator 1130. Accordingly, the camera modules 1100a through 1100c may include the same or different calibration data 1147 according to the operation of the actuators 1130 included therein.

In some embodiments, one (e.g., 1100b) of the camera modules 1100a through 1100c may be a folded lens camera module including the prism 1105 and the OPFE 1110 described above, and the other camera modules (e.g., 1100a and 1100c) may be vertical camera modules not including the prism 1105 and the OPFE 1110. However, embodiments are not limited thereto.

In some embodiments, one (e.g., 1100c) of the camera modules 1100a through 1100c may be a vertical depth camera that extracts depth information using, for example, infrared rays (IR). In this case, the application processor 1200 may generate a 3D depth image by merging image data received from the depth camera and image data received from another camera module (e.g., 1100a or 1100b).

In some embodiments, at least two (e.g., 1100a and 1100c) of the camera modules 1100a through 1100c may have different fields of view (viewing angles). In this case, optical lenses of at least two (e.g., 1100a and 1100c) of the camera modules 1100a through 1100c may be different from each other, but embodiments are not limited thereto.

In addition, in some embodiments, the camera modules 1100a through 1100c may have different viewing angles. In this case, optical lenses included in the camera modules 1100a through 1100c may also be different from each other, but embodiments are not limited thereto.

In some embodiments, the camera modules 1100a through 1100c may be physically separated from each other. That is, a sensing region of one image sensor 1142 may not be divided and used by the camera modules 1100a through 1100c, but an independent image sensor 1142 may be disposed in each of the camera modules 1100a through 1100c.

Referring again to FIG. 23, the application processor 1200 may include an image processing device 1210, a memory controller 1220, and an internal memory 1230. The application processor 1200 may be separated from the camera modules 1100a through 1100c. For example, the application processor 1200 and the camera modules 1100a through 1100c may be implemented as separate semiconductor chips.

The image processing device 1210 may include a plurality of sub image processors 1212a through 1212c, an image generator 1214, and a camera module controller 1216.

The image processing device 1210 may include a number of sub image processors 1212a through 1212c corresponding to the number of camera modules 1100a through 1100c.

Image data generated by the camera modules 1100a through 1100c may be provided to the sub image processors 1212a through 1212c through corresponding image signal lines ISLa through ISLc separated from each other. For example, image data generated by the camera module 1100a may be provided to the sub image processor 1212a through the image signal line ISLa, image data generated by the camera module 1100b may be provided to the sub image processor 1212b through the image signal line ISLb, and image data generated by the camera module 1100c may be provided to the sub image processor 1212c through the image signal line ISLc. This image data transmission may be performed, for example, using a camera serial interface (CSI) based on a mobile industry processor interface (MIPI), but embodiments are not limited thereto.

In some embodiments, one sub image processor may be disposed to correspond to a plurality of camera modules. For example, the sub image processor 1212a and the sub image processor 1212c may not be separated from each other as illustrated in the drawing but may be integrated into a single sub image processor, and image data provided by the camera module 1100a and the camera module 1100c may be selected through a select element (e.g., a multiplexer) and then provided to the single sub image processor.

The image data provided to each of the sub image processors 1212a through 1212c may be provided to the image generator 1214. The image generator 1214 may generate an output image using the image data received from each of the sub image processors 1212a through 1212c according to image generating information or a mode signal.

The image generator 1214 may generate an output image by merging at least some of the image data generated by the camera modules 1100a through 1100c having different viewing angles according to the image generating information or the mode signal. In addition, the image generator 1214 may generate an output image by selecting any one of the image data generated by the camera modules 1100a through 1100c having different viewing angles according to the image generating information or the mode signal.

In some embodiments, the image generating information may include a zoom signal or a zoom factor. In addition, in some embodiments, the mode signal may be, for example, a signal based on a mode selected by a user.

When the image generating information is the zoom signal (zoom factor) and the camera modules 1100a through 1100c have different fields of view (viewing angles), the image generator 1214 may operate differently according to the type of the zoom signal. For example, if the zoom signal is a first signal, the image generator 1214 may merge image data output from the camera module 1100a and image data output from the camera module 1100c and then generate an output image using the merged image signal and image data output from the camera module 1100b and not used in the merging. If the zoom signal is a second signal different from the first signal, the image generator 1214 may not perform such image data merging and may generate an output image by selecting any one of the image data output from the camera modules 1100a through 1100c. However, embodiments are not limited thereto, and a method of processing image data can be modified as needed.

In some embodiments, the image generator 1214 may receive a plurality of image data having different exposure times from any one or any combination of the sub image processors 1212a through 1212c and may generate merged image data with an increased dynamic range by performing high dynamic range (HDR) processing on the image data.

The camera module controller 1216 may provide a control signal to each of the camera modules 1100a through 1100c. The control signal generated by the camera module controller 1216 may be provided to the camera modules 1100a through 1100c through corresponding control signal lines CSLa through CSLc separated from each other.

Any one (e.g., 1100a) of the camera modules 1100a through 1100c may be designated as a master camera according to the image generating information including the zoom signal or the mode signal, and the other camera modules (e.g., 1100b and 1100c) may be designated as slave cameras. This information may be included in the control signal and provided to the camera modules 1100a through 1100c through the corresponding control signal lines CSLa through CSLc separated from each other.

Camera modules operating as a master and a slave may be changed according to the zoom factor or the operation mode signal. For example, when the viewing angle of the camera module 1100a is wider than that of the camera module 1100c and the zoom factor indicates a low zoom ratio, the camera module 1100c may operate as a master, and the camera module 1100a may operate as a slave. Conversely, when the zoom factor indicates a high zoom ratio, the camera module 1100a may operate as a master, and the camera module 1100c may operate as a slave.

In some embodiments, the control signal provided from the camera module controller 1216 to each of the camera modules 1100a through 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b receiving the sync enable signal may generate a sync signal based on the sync enable signal and provide the generated sync signal to the camera modules 1100a and 1100c through a sync signal line SSL. The camera module 1100b and the camera modules 1100a and 1100c may transmit image data to the application processor 1200 in synchronization with the sync signal.

In some embodiments, the control signal provided from the camera module controller 1216 to the camera modules 1100a through 1100c may include mode information according to the mode signal. Based on the mode information, the camera modules 1100a through 1100c may operate in a first operation mode and a second operation mode in relation to the sensing speed.

In the first operation mode, the camera modules 1100a through 1100c may generate an image signal at a first speed (e.g., generate an image signal of a first frame rate), encode the image signal at a second speed higher than the first speed (e.g., encode the image signal into an image signal of a second frame rate higher than the first frame rate), and transmit the encoded image signal to the application processor 1200. Here, the second speed may be 30 times or less of the first speed.

The application processor 1200 may store the received image signal, in other words, the encoded image signal in the internal memory 1230 included in the application processor 1200 or the external memory 1400 outside the application processor 1200. Later, the application processor 1200 may read the encoded image signal from the internal memory 1230 or the external memory 1400, decode the read image signal, and display image data generated based on the decoded image signal. For example, a corresponding sub processor among the sub image processors 1212a through 1212c of the image processing device 1210 may decode the encoded image signal and may also perform image processing on the decoded image signal. For example, image data generated based on the decoded image signal may be displayed on the display 1500.

In the second operation mode, the camera modules 1100a through 1100c may generate an image signal at a third speed lower than the first speed (e.g., generate an image signal of a third frame rate lower than the first frame rate) and transmit the image signal to the application processor 1200.

The image signal provided to the application processor 1200 may be an unencoded signal. The application processor 1200 may perform image processing on the received image signal or may store the image signal in the internal memory 1230 or the external memory 1400.

The PMIC 1300 may supply power, for example, a power supply voltage to each of the camera modules 1100a through 1100c. For example, the PMIC 1300 may supply first power to the camera module 1100a through a power signal line PSLa, supply second power to the camera module 1100b through a power signal line PSLb, and supply third power to the camera module 1100c through a power signal line PSLc under the control of the application processor 1200.

The PMIC 1300 may generate power corresponding to each of the camera modules 1100a through 1100c and also adjust the level of the power in response to a power control signal PCON from the application processor 1200. The power control signal PCON may include a power adjustment signal for each operation mode of the camera modules 1100a through 1100c. For example, the operation modes may include a low power mode. Here, the power control signal PCON may include information about a camera module operating in the lower power mode and a set power level. The level of power provided to each of the camera modules 1100a through 1100c may be the same or different. In addition, the level of the power may be dynamically changed. In some embodiments, the PMIC 1300 may provide an analog signal processing voltage VA, a first digital signal processing voltage VD1, and a second digital signal processing voltage VD2.

While the disclosure has been shown and described with reference to embodiments thereof, it will be understood by those of ordinary skill in the art that various changes in form and detail may be made therein without departing from the spirit and scope of the disclosure as defined by the following claims. The embodiments may be considered in a descriptive sense only and not for purposes of limitation.

What is claimed is:

1. An image sensor comprising:
   a pixel configured to generate a pixel signal, using an analog signal processing voltage;
   a ramp signal generator configured to generate a ramp signal, using the analog signal processing voltage;
   a bias voltage generator configured to generate a bias voltage, using the analog signal processing voltage;
   a noise compensator configured to:
     generate a noise component, using a digital signal processing voltage and the analog signal processing voltage; and
     add the generated noise component to the generated bias voltage; and
   a conversion circuit configured to:
     generate a reference voltage, based on the generated ramp signal and the bias voltage to which the noise component is added; and
     generate an image signal by performing analog-to-digital conversion on the generated pixel signal, based on the generated reference voltage,
   wherein the analog-to-digital conversion is performed using the digital signal processing voltage.

2. The image sensor of claim 1, wherein a magnitude of the analog signal processing voltage is greater than a magnitude of the digital signal processing voltage.

3. The image sensor of claim 1, wherein the analog signal processing voltage comprises a first sub analog signal processing voltage, a second sub analog signal processing voltage and a third sub analog signal processing voltage, wherein the pixel signal is generated using the first sub analog signal processing voltage, wherein the ramp signal is generated using the second sub analog signal processing voltage, and wherein the bias voltage is generated using the third sub analog signal processing voltage.

4. The image sensor of claim 3, wherein the noise component is generated using the digital signal processing voltage, the first sub analog signal processing voltage, the second sub analog signal processing voltage and the third sub analog signal processing voltage.

5. The image sensor of claim 1, wherein the reference voltage is generated using the analog signal processing voltage.

6. The image sensor of claim 1, further comprising a memory interface device configured to send the generated image signal, using the digital signal processing voltage.

7. The image sensor of claim 1, further comprising a voltage generator configured to generate the digital signal processing voltage and the analog signal processing voltage.

8. The image sensor of claim 7, wherein the voltage generator is further configured to:

provide the generated analog signal processing voltage to the pixel, the ramp signal generator, the bias voltage generator and the noise compensator; and provide the generated digital signal processing voltage to the noise compensator and the conversion circuit.

9. The image sensor of claim 1, wherein the generated noise component corresponds to a noise component of the pixel signal.

10. The image sensor of claim 1, wherein the pixel is disposed on an upper portion of the image sensor, wherein the ramp signal generator, the bias voltage generator, the conversion circuit and a memory interface are disposed on a lower portion of the image sensor, and wherein the noise compensator is further configured to receive, from the lower portion of the image sensor, the analog signal processing voltage and the digital signal processing voltage.

11. The image sensor of claim 1, wherein the noise compensator comprises:

a first sub noise compensator configured to adjust the analog signal processing voltage; and a second sub noise compensator configured to adjust the digital signal processing voltage, and wherein the noise compensator is further configured to change the noise component, using the adjusted analog signal processing voltage and the adjusted digital signal processing voltage.

12. An image sensor comprising:

a pixel configured to generate a pixel signal, using an analog signal processing voltage;

a ramp signal generator configured to generate a ramp signal, using the analog signal processing voltage;

a bias voltage generator configured to generate a bias voltage, using the analog signal processing voltage;

a conversion circuit configured to:

generate a reference voltage, based on the generated bias voltage and the generated ramp signal; and generate a first digital signal by performing analog-to-digital conversion on the generated pixel signal, based on the generated reference voltage;

a noise compensator configured to:

generate a noise signal, using a digital signal processing voltage and the analog signal processing voltage; and generate a second digital signal by performing analog-to-digital conversion on the generated noise signal, based on the generated ramp signal; and a subtracter configured to generate a third digital signal by subtracting the generated second digital signal from the generated first digital signal.

13. The image sensor of claim 12, wherein a magnitude of the analog signal processing voltage is greater than a magnitude of the digital signal processing voltage.

14. The image sensor of claim 12, further comprising a voltage generator configured to generate the digital signal processing voltage and the analog signal processing voltage.

15. The image sensor of claim 14, wherein the voltage generator is further configured to:

provide the generated analog signal processing voltage to the pixel, the ramp signal generator, the bias voltage generator and the noise compensator; and provide the generated digital signal processing voltage to the noise compensator and the conversion circuit.

16. An image sensing system comprising:

an image sensor configured to output an image signal by sensing light incident on a pixel; and an image signal processor configured to process the outputted image signal, using a first digital signal processing voltage, wherein the image sensor comprises:

the pixel configured to generate a pixel signal, using an analog signal processing voltage;

a ramp signal generator configured to generate a ramp signal, using the analog signal processing voltage;

a bias voltage generator configured to generate a bias voltage, using the analog signal processing voltage;

a noise compensator configured to:

generate a noise component, using the first digital signal processing voltage, a second digital signal processing voltage and the analog signal processing voltage; and add the generated noise component to the generated bias voltage; and a conversion circuit configured to:

generate a reference voltage, based on the generated ramp signal and the bias voltage to which the noise component is added; and generate the image signal by performing analog-to-digital conversion on the generated pixel signal, based on the generated reference voltage.

17. The image sensing system of claim 16, further comprising an application processor, wherein the image signal processor is further configured to provide the processed image signal processed to the application processor.

18. The image sensing system of claim 16, wherein the image sensor and the image signal processor are implemented as a semiconductor chip in a camera module, and wherein the semiconductor chip is configured to use the first digital signal processing voltage, the second digital signal processing voltage and the analog signal processing voltage.

19. The image sensing system of claim 16, wherein the image signal processor is included in an application processor configured to process the processed image signal, using the first digital signal processing voltage.

* * * * *